US012628226B2

(12) United States Patent
Siomina et al.

(10) Patent No.: US 12,628,226 B2
(45) Date of Patent: May 12, 2026

(54) METHODS FOR ADAPTIVE USER EQUIPMENT BEHAVIOR FOR CELL RECONFIGURATION IN NR-U

(71) Applicant: Telefonaktiebolaget LM Ericsson (PUBL), Stockholm (SE)

(72) Inventors: Iana Siomina, Täby (SE); Muhammad Ali Kazmi, Sundbyberg (SE); Joakim Axmon, Limhamn (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 766 days.

(21) Appl. No.: 17/766,080

(22) PCT Filed: Oct. 2, 2020

(86) PCT No.: PCT/IB2020/059259
§ 371 (c)(1),
(2) Date: Apr. 1, 2022

(87) PCT Pub. No.: WO2021/064670
PCT Pub. Date: Apr. 8, 2021

(65) Prior Publication Data
US 2022/0353938 A1 Nov. 3, 2022

Related U.S. Application Data

(60) Provisional application No. 62/910,741, filed on Oct. 4, 2019.

(51) Int. Cl.
H04W 76/18 (2018.01)
H04L 1/1812 (2023.01)
(Continued)

(52) U.S. Cl.
CPC ........... H04W 76/18 (2018.02); H04L 1/1812 (2013.01); H04W 24/10 (2013.01); H04W 74/0816 (2013.01); H04W 76/30 (2018.02)

(58) Field of Classification Search
None
See application file for complete search history.

(56) References Cited

U.S. PATENT DOCUMENTS 10,225,859 B2 3/2019 Vajapeyam et al.
10,477,584 B2 11/2019 Li et al.
(Continued)

FOREIGN PATENT DOCUMENTS

CO 2020004217 A2 4/2020
CO 2020004238 A2 8/2020
(Continued)

OTHER PUBLICATIONS

Office Action issued for Chinese Patent Application Serial No. 202080083713.2—Nov. 30, 2023.
(Continued)

*Primary Examiner* — Kodzovi Acolatse
(74) *Attorney, Agent, or Firm* — Baker Botts L.L.P.

(57) ABSTRACT

A method by a wireless device includes receiving, from a network node, a command associated with a procedure to setup or release a cell or a signal. While transmitting a Hybrid Automatic Repeat Request (HARQ), feedback associated with the procedure to setup or release the cell or signal, the wireless device detects one or more clear channel assessment (CCA) failures on an uplink signal. The wireless device extends a transmission period for transmitting the HARQ feedback associated with the procedure to setup or release the cell or signal based on the one or more CCA failures.

25 Claims, 11 Drawing Sheets

(51) Int. Cl.

| | |
|---|---|
| *H04W 24/10* | (2009.01) |
| *H04W 74/0816* | (2024.01) |
| *H04W 76/30* | (2018.01) |

(56) References Cited

U.S. PATENT DOCUMENTS

| | | | | |
|---|---|---|---|---|
| 11,743,944 | B2 | 8/2023 | Koorapaty et al. | |
| 2015/0270869 | A1* | 9/2015 | Bivol | H04B 1/715 |
| | | | | 375/132 |
| 2016/0233989 | A1* | 8/2016 | Belghoul | H04L 5/001 |
| 2016/0309354 | A1* | 10/2016 | Yerramalli | H04W 72/0473 |
| 2016/0345326 | A1 | 11/2016 | Yerramalli et al. | |
| 2017/0027002 | A1* | 1/2017 | Yerramalli | H04W 74/0816 |
| 2017/0041957 | A1 | 2/2017 | Pazhyannur et al. | |
| 2017/0127442 | A1* | 5/2017 | Sun | H04L 5/0055 |
| 2017/0142754 | A1* | 5/2017 | Uziel | H04W 16/14 |
| 2018/0035438 | A1* | 2/2018 | Pao | H04W 72/21 |
| 2018/0103458 | A1* | 4/2018 | Tooher | H04W 74/0808 |
| 2018/0159675 | A1 | 6/2018 | Yang et al. | |
| 2018/0176955 | A1 | 6/2018 | Salem et al. | |
| 2018/0220459 | A1 | 8/2018 | Park et al. | |
| 2018/0242357 | A1 | 8/2018 | Khirallah et al. | |
| 2018/0249499 | A1 | 8/2018 | Kim et al. | |
| 2018/0338319 | A1 | 11/2018 | Kim et al. | |
| 2018/0359068 | A1 | 12/2018 | Kim et al. | |
| 2018/0368142 | A1 | 12/2018 | Liou | |
| 2018/0376495 | A1 | 12/2018 | Lee et al. | |
| 2019/0090240 | A1 | 3/2019 | Ahn et al. | |
| 2019/0268935 | A1 | 8/2019 | Talarico et al. | |
| 2019/0268971 | A1 | 8/2019 | Talarico et al. | |
| 2019/0297620 | A1 | 9/2019 | Tian et al. | |
| 2019/0306923 | A1 | 10/2019 | Xiong et al. | |
| 2019/0313432 | A1 | 10/2019 | Belghoul et al. | |
| 2019/0387412 | A1 | 12/2019 | Kim et al. | |
| 2021/0036808 | A1 | 2/2021 | Papasakellariou et al. | |
| 2022/0014337 | A1* | 1/2022 | Ouchi | H04W 74/0808 |

FOREIGN PATENT DOCUMENTS

| | | | |
|---|---|---|---|
| CO | 2020010032 | A2 | 11/2020 |
| ES | 2790275 | T3 | 10/2020 |
| ES | 2837103 | T3 | 6/2021 |
| ES | 2875004 | T3 | 11/2021 |
| WO | WO2018151539 | A1 | 8/2018 |

OTHER PUBLICATIONS

Search Report issued for Chinese Patent Application Serial No. 2020800837132—Nov. 28, 2023.

3GPP TSG-RAN WG4 Meeting #92; Ljubljana, Slovenia; Source: Ericsson; Title: On SCell activation delay in NR-U (R4-1909466)—Aug. 26-30, 2019.

PCT International Search Report issued for International application No. PCT/IB2020/059259—Feb. 4, 2021.

PCT Written Opinion of the International Searching Authority issued for International application No. PCT/IB2020/059259—Feb. 4, 2021.

Official Action issued for Japanese Application No. 2022-520382—Oct. 24, 2023.

3GPP TSG-RAN WG4 Meeting #92-Bis; Chongqing, P. R. of China, Oct. 14-18, 2019; Agenda Item: 8.1.4; Source: Ericsson; Title: Ad hoc minutes for NR-U RRM requirements (R4-1912787).

3GPP TSG-RAN WG4 Meeting #92; Ljubljana, Slovenia, Aug. 26-30, 2019; Agenda Item: 9.1.5.4; Title: On TCI requirements for NR-U (R4-1909472).

3GPP TSG-RAN WG4 Meeting #92; Ljubljana, Slovenia, Aug. 26-30, 2019; Agenda item: 9.1.5.4; Title: On SCell Activation/de-activation Requirements for NR-U; Source: Qualcomm Incorporated (R4-1908495).

Notice of Reasons for Rejection issued for Japanese Patent Application No. 2022-520382—May 30, 2023.

Columbian Office Action issued for NC2022/0004976—Oct. 16, 2025.

\* cited by examiner

| Channel busy | Deferral | s | | | | | Tx opportunity |
|---|---|---|---|---|---|---|---|

FIGURE 1

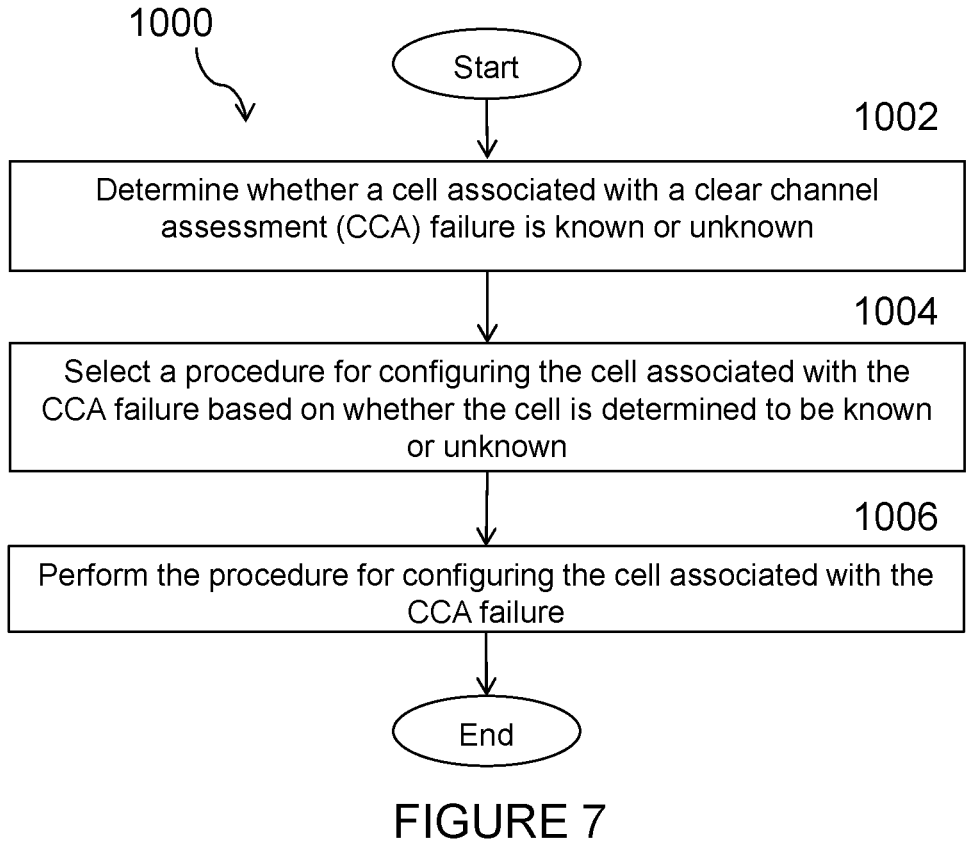

1000

Start

1002

Determine whether a cell associated with a clear channel assessment (CCA) failure is known or unknown

1004

Select a procedure for configuring the cell associated with the CCA failure based on whether the cell is determined to be known or unknown

1006

Perform the procedure for configuring the cell associated with the CCA failure

End

FIGURE 7

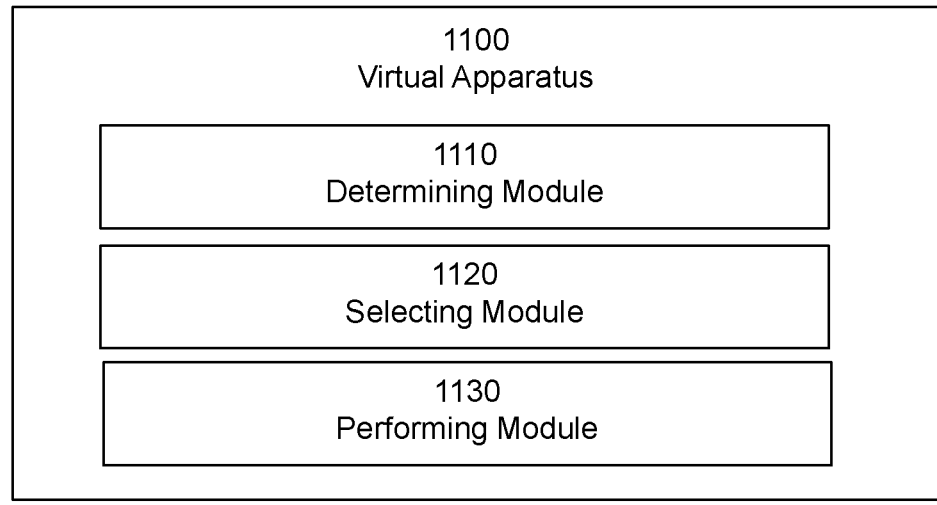

1100
Virtual Apparatus

1110
Determining Module

1120
Selecting Module

1130
Performing Module

FIGURE 8

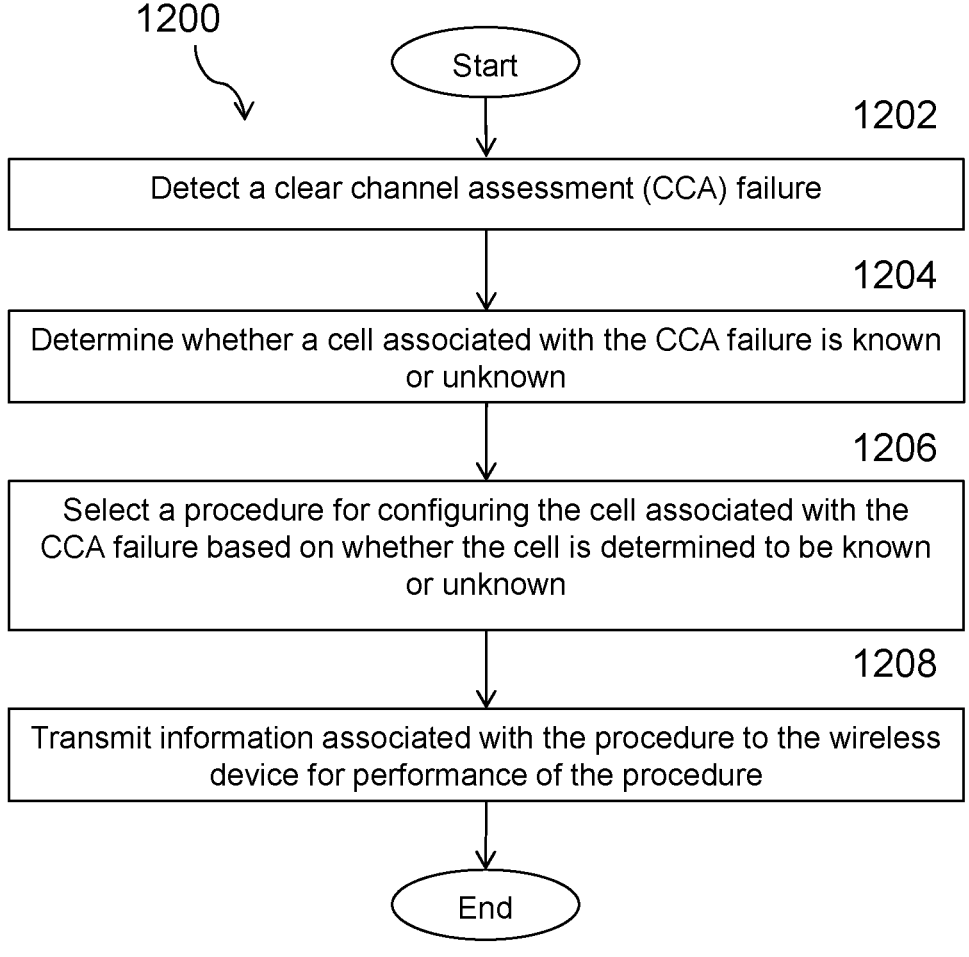

1200

Start

1202

Detect a clear channel assessment (CCA) failure

1204

Determine whether a cell associated with the CCA failure is known or unknown

1206

Select a procedure for configuring the cell associated with the CCA failure based on whether the cell is determined to be known or unknown

1208

Transmit information associated with the procedure to the wireless device for performance of the procedure End

FIGURE 9

METHODS FOR ADAPTIVE USER EQUIPMENT BEHAVIOR FOR CELL RECONFIGURATION IN NR-U

PRIORITY

This nonprovisional application is a U.S. National Stage Filing under 35 U.S.C. § 371 of International Patent Application Serial No. PCT/IB2020/059259 filed Oct. 2, 2020 and entitled "METHODS FOR ADAPTIVE USER EQUIP-MENT BEHAVIOR FOR CELL RECONFIGURATION IN NR-U" which claims priority to U.S. Provisional Patent Application No. 62/910,741 filed Oct. 4, 2019, both of which are hereby incorporated by reference in their entirety.

TECHNICAL FIELD

The present disclosure relates, in general, to wireless communications and, more particularly, systems and methods for adaptive user equipment behavior for cell reconfiguration in New Radio-Unlicensed (NRU).

BACKGROUND

New radio (NR) standard in $3^{rd}$ Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

New Radio Unlicensed (NR-U) or NR in Unlicensed Spectrum

Some parts of the spectrum have become potentially available for license-assisted access to unlicensed operation. This spectrum can be used by operators to augment their service offerings in licensed bands by being operated under a license-exempt regime or Industrial, Scientific, and Medical (ISM) but must be shared with existing mobile services and other incumbent services. During the NR-U study Item in 3GPP, different unlicensed bands or shared bands have been further discussed, such as 2.4 GHz band, 3.5 GHz band, 5 GHz band, and 6 GHz band.

For channel access mechanism, Long Term Evolution (LTE)-License Assisted Access (LAA) LBT (Listen-Before-Talk) mechanism is adopted as baseline for 5 GHz band and adopted as the starting point of the design for 6 GHz band. At least for band where absence of Wi-Fi cannot be guaranteed (e.g. by regulation), LBT can be performed in units of 20 MHz.

During LBT, the transmitting node determines whether there are no other transmissions (by performing certain measurements and comparing to a threshold) and if so it starts Channel Occupancy Time (COT) which does not exceed maximum COT (MCOT) can vary by regions; otherwise, it seizes its transmissions for a certain time and may retry again later. However, unlike in LTE, there are more LBT categories in NR and for some categories (Cat2), there are also 16 μs Cat2 and 25 μs Cat2 LBT types, depending on the switching time between uplink (UL) and downlink (DL) (16 μs Cat2 means the switching longer than 16 but shorter than 25, and 25 μs Cat2 means 25 or longer). In addition, there is also a concept of UE transmitting based on LBT procedure during BS-initiated COT (shared COT).

Similar to LTE, NR-U is expected to have discovery signals (DRS) or similar, e.g., to enable initial access and measurements. LTE DRS contains only Primary Synchronization Signal (PSS)/Secondary Synchronization Signal (SSS)/Cell-specific Reference Signals (CRS), but NR DRS may comprise more signals/channels.

Channel Access Schemes

Figure 1:
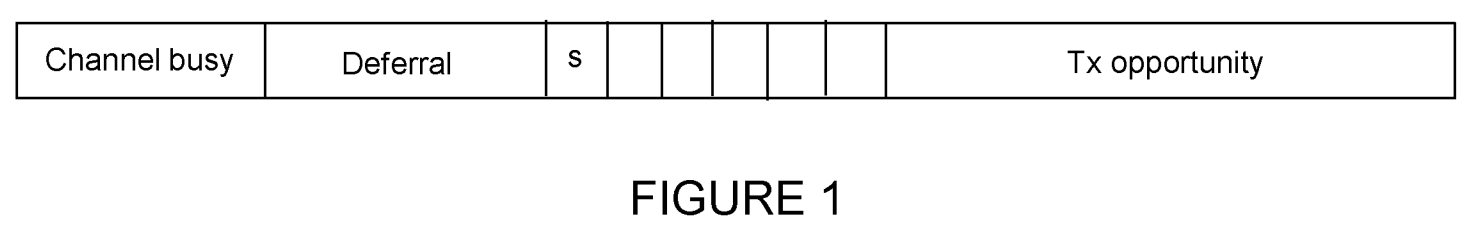

FIG. 1 illustrates LTE LBT and COT, where "s" is the sensing time period. In this figure, if the channel is determined to be busy, after some deferral time the user equipment (UE) may try again to sense on the channel in order to determine whether the channel is available, and if so after some deterministic backoff time the UE may start transmitting uplink (UL) burst (during the UE's channel occupancy time) but for no longer than the maximum channel occupancy time (MCOT) which can be e.g. up to 10 ms, depending on the region.

The channel access schemes for NR-based access for unlicensed spectrum can be classified into the following categories:

Category 1 (Cat 1): Immediate transmission after a short switching gap

Category 2 (Cat 2): LBT without random back-off—like in LTE

Category 3 (Cat 3): LBT with random back-off with a contention window of fixed size Category 4 (Cat 4): LBT with random back-off with a contention window of variable size For different transmissions in a COT and different channels/signals to be transmitted, different categories of channel access schemes can be used. The applicability of the channel access schemes is described in 3GPP TR 38.889, for example.

Channel access mechanisms for beamformed transmissions have been studied. It has been identified that omni-directional LBT should be supported. Using directional LBT for beamformed transmissions, i.e. LBT performed in the direction of the transmitted, has also been studied. Further consideration is required regarding directional LBT and its benefits for beamformed transmissions when the specifications are to be developed, taking into account regulations and fair co-existence with other technologies.

Examples of Setup or Release Procedures Associated with UE Feedback in NR

The techniques are applicable to any type of setup or release procedure which requires the UE to send a feedback signal in response to receiving a setup or release message. Examples of the feedback signals are HARQ feedback such as acknowledgement (ACK), negative acknowledgement (NACK), etc. The setup or release procedure comprises for example setting up a cell or a signal (e.g. a beam). Examples of procedures to setup or release a cell may include, for example, setting up or releasing a serving cell such as, for example, cell change to new/target cell, Secondary Cell (SCell) activation, Secondary Cell (SCell) deactivation, configuration of a serving cell (e.g. SCell), direction activation of a serving cell (e.g. direct SCell activation etc.), configuration or reconfiguration of special cell (SpCell) (e.g. Primary Secondary Cell (PSCell) addition or PSCell release, etc.). The setup or release procedure comprises, for example, setting up a signal (e.g. a beam) comprises switching a beam such as switching a Transmission Configuration Indicator (TCI) state.

PSCell Addition in NR

In Rel-15, upon receiving PSCell addition in subframe n, the UE shall be capable to transmit Physical Random Access Channel (PRACH) preamble towards PSCell no later than in subframe $n+T_{config\_PSCell}$, as follows:

$$T_{config\_PSCell}=T_{RRC\_delay}+T_{processing}+T_{search}+T_\Delta+$$
$$T_{PSCell\_DU}+2 \text{ ms}$$

where:

$T_{RRC\_delay}$ is the Radio Resource Control (RRC) procedure delay as specified in 3GPP TS 38.331 for NR-Direct Connectivity (NR-DC) and in 3GPP TS 36.331 for EN-DC $T_{processing}$ is the SW processing time needed by UE, including RF warm up period. $T_{processing}$=20 ms if NR PSCell is in FR1, $T_{processing}$=40 ms if NR PSCell is in FR2.

$T_{search}$ is the time for AGC settling and PSS/SSS detection. If the target cell is known, $T_{search}$=0 ms. If the target cell is unknown, provided that the side condition Ês/Iot≥−2 dB is fulfilled, $T_{search}$=3*Trs ms for FR1 and 24*Trs ms for FR2.

$T_A$ is time for fine time tracking and acquiring full timing information of the target cell. $T_A$=1*Trs ms for a known and for an unknown PSCell.

$T_{PSCell\_DU}$ is the delay uncertainty in acquiring the first available PRACH occasion in the PSCell. $T_{PSCell\_DU}$ is up to the summation of SSB to PRACH occasion association period and 10 ms. SSB to PRACH occasion associated period is defined in Table 8.1-1 of 3GPP TS 38.213.

Trs is the SB-based Radio Resource Management (RRM) Measurement Timing Configuration window (SMTC) periodicity of the target cell if the UE has been provided with an SMTC configuration for the target cell in PSCell addition message, otherwise Trs is the SMTC configured in the measObjectNR having the same SSB frequency and subcarrier spacing. If the UE is not provided SMTC configuration or measurement object on this frequency, the requirement in this section is applied with Trs=5 ms assuming the SSB transmission periodicity is 5 ms.

Furthermore, the NR PSCell is known if it has been meeting the following conditions:

During the last [5] seconds before the reception of the NR PSCell configuration command:

the UE has sent a valid measurement report for the NR PSCell being configured and One of the SSBs measured from the NR PSCell being configured remains detectable according to the cell identification conditions.

One of the SSBs measured from NR PSCell being configured also remains detectable during the NR PSCell configuration delay according to the cell identification conditions.

Scell Activation in NR

In NR FR1, upon receiving SCell activation command in slot n, the UE shall be capable to transmit valid Channel State Information (CSI) report and apply actions related to the activation command for the S Cell being activated no later than in slot:

$$n + \frac{T_{HARQ} + T_{activation} + T_{CSI\_Reporting}}{NR \text{ slot length}},$$

where:

$T_{HARQ}$ (in ms) is the timing between downlink (DL) data transmission and acknowledgement as specified in 3GPP TS 38.213

$T_{activation\_time}$ is the SCell activation delay in millisecond.

If the SCell is known and belongs to FR1, $T_{activation\_time}$ is:

$T_{FirstSSB}$+5 ms, if the SCell measurement cycle is equal to or smaller than 160 ms.

$T_{SMTC\_MAX}$+$T_{rs}$+5 ms, if the SCell measurement cycle is larger than 160 ms.

If the SCell is unknown and belongs to FR1, $T_{activation\_time}$ is:

2*$T_{SMTC\_MAX}$+2*$T_{rs}$+5 ms provided the SCell can be successfully detected on the first attempt.

Where $T_{SMTC\_MAX}$:

For intra-band SCell activation, $T_{SMTC\_MAX}$ is the longer SMTC periodicity between active serving cells and SCell being activated provided the cell specific reference signals from the active serving cells and the SCells being activated or released are available in the same slot; in case of For inter-band SCell activation, $T_{SMTC\_MAX}$ is the SMTC periodicity of SCell being activated.

$T_{SMTC\_MAX}$ is bounded to a minimum value of 10 ms.

$T_{rs}$ is the SMTC periodicity of the SCell being activated if the UE has been provided with an SMTC configuration for the SCell in SCell addition message, otherwise $T_{rs}$ is the SMTC configured in the measObjectNR having the same SSB frequency and subcarrier spacing. If the UE is not provided SMTC configuration or measurement object on this frequency, the requirement which involves $T_{rs}$ is applied with $T_{rs}$=5 ms assuming the SSB transmission periodicity is 5 ms. There is no requirements if the SSB transmission periodicity is not 5 ms.

$T_{FirstSSB}$: Is the time to first SSB indicated by the SMTC after $n+T_{HARQ}$+3 ms.

$T_{CSI\_reporting}$ is the delay (in ms) including uncertainty in acquiring the first available downlink CSI reference resource, UE processing time for CSI reporting and uncertainty in acquiring the first available CSI reporting resources as specified in 3GPP TS 38.331.

In addition to CSI reporting defined above, UE shall also apply other actions related to the activation command specified in 3GPP TS 38.331 for a SCell at the first opportunities for the corresponding actions once the SCell is activated.

Starting from the slot specified in clause 4.3 of 3GPP TS 38.213 (timing for secondary Cell activation/deactivation) and until the UE has completed the SCell activation, the UE shall report out of range if the UE has available uplink resources to report Channel Quality Information (CQI) for the SCell.

Furthermore, in Rel-15, an NR SCell in FR1 is known if it has been meeting the following conditions:

During the period equal to max([5] measCycleSCell, Discontinuous Reception (DRX) cycles) for FR1 before the reception of the SCell activation command:

the UE has sent a valid measurement report for the SCell being activated and the SSB measured remains detectable according to the cell identification conditions the SSB measured during the period equal to max(5 measCycleSCell, 5 DRX cycles) also remains detectable during the SCell activation delay according to the cell identification conditions Otherwise the SCell in FR1 is unknown.

Furthermore, when the UE is receiving a SCell activation command, there are several actions to be carried out by the

5

UE. Particularly, for an activation command received in slot n, the UE shall start or restart the sCellDeactivationTimer associated with the SCell in slot n+k, where k is in the order of a few slots but is depending on the exact configuration. In case this timer expires, the UE shall deactivate the SCell. The timer is configurable via RRC signalling, and can take values between 20 ms up to 1280 ms. If a value is not configured by the network via RRC, the UE applies the value infinity, i.e., the timer never expires. The sCellDeactivationTimer is restarted at least when the UE receives a Physical Downlink Shared Channel (PDSCH) transport block carrying a Medium Access Control (MAC) Packet Data Unit (PDU). Deactivation of SCell due to expiry of sCellDeactivationTimer shall not be carried out in case the SCell is configured with Physical Uplink Control Channel (PUCCH).

Transmission Configuration Indication (TCI)

A UE is configured by the network node with one active transmission configuration indication (TCI) state for physical downlink control channel (PDCCH) and physical downlink shared channel (PDSCH), respectively. The active TCI indicates for each of the channels which timing reference the UE shall assume for the downlink reception. The timing reference may be with respect to an SSB index associated with a particular Tx beam, or with respect to a particular downlink reference signals (DL-RS), such as, for example, channel state information reference signals-(CSI-RS) resource configured by the network node and provided (i.e. transmitted) to the UE.

Implicitly, the active TCI state additionally indicates to the UE which UE reception (Rx) beam to use when receiving PDCCH and/or PDSCH, since it shall use the Rx beam that allows best conditions for receiving the SSB index or DL-RS resource associated with the TCI state. Note that the best UE RX beam for a given TCI state may change over time e.g. if the UE orientation changes, but also has to be relatively static at least over short time intervals.

Up to 8 TCI states can be configured for PDSCH via higher layer signaling (RRC signaling), but only one TCI state can be active at any time. In case several TCI states are configured by the network node, the network node indicates to the UE via Downlink Control Information (DCI) (downlink control signaling over PDCCH) which one of the pre-configured TCI states to activate for upcoming PDSCH reception(s).

The TCI state can be switched by the UE based on received command via MAC, DCI or RRC messages etc. Upon receiving a TCI state command the UE first sends HARQ feedback to the serving cell and switches active TCI state within certain delay.

Certain problems exist, however. For example, in Rel-15 NR, it is assumed that a gNodeB (gNB) is always able to transmit the configured signals, which is not the case in NR-U where the possibility to transmit radio signals/channel depends on channel availability and the success of the LBT procedure performed by the node which needs to transmit. On the other side, UE cannot rely on that the signals are always transmitted and ideally it needs to somehow determine whether they are present or not, otherwise the UE may end up processing interference and noise only but not the wanted signals. The procedure for cell reconfiguration (e.g., PSCell addition, SCell activation, etc.) in NR-U may take longer time to account for DL and/or UL LBT, but it is unclear how much long it can be acceptable and what is the UE behavior if a time limit for one or more of the phases of the cell reconfiguration gets excessively delayed due to DL and/or UL LBT.

Furthermore, there is a known/unknown cell definition which determines how the cell reconfiguration procedure is performed, e.g., for unknown cell the UE needs to perform additional steps such as, for example, to acquire timing and/or perform a measurement, and therefore needs more time for the whole cell reconfiguration procedure. Currently, the known/unknown SCell and PSCell definitions do not account for LBT. Furthermore, if the Rel-15 NR known/unknown cell definitions for cell reconfiguration procedures are reused (without changing) for NR-U, there is a risk that the cells will always be seen as unknown which will result in unnecessary extra steps and power consumption in the UE and degraded UE and system performance in multi-carrier networks (e.g., networks with carrier aggregation and/or dual- or multi-connectivity).

SUMMARY

Certain aspects of the present disclosure and their embodiments may provide solutions to these or other challenges.

According to certain embodiments, a method by a wireless device includes receiving, from a network node, a command associated with a procedure to setup or release a cell or a signal. While transmitting a Hybrid Automatic Repeat Request (HARQ), feedback associated with the procedure to setup or release the cell or signal, the wireless device detects one or more clear channel assessment (CCA) failures on an uplink signal. The wireless device extends a transmission period for transmitting the HARQ feedback associated with the procedure to setup or release the cell or signal based on the one or more CCA failures.

According to certain embodiments, a wireless device includes processing circuitry configured to receive, from a network node, a command associated with a procedure to setup or release a cell or a signal. While transmitting a HARQ, feedback associated with the procedure to setup or release the cell or signal, the processing circuitry is configured to detect one or more CCA failures on an uplink signal. The wireless device extends a transmission period for transmitting the HARQ feedback associated with the procedure to setup or release the cell or signal based on the one or more CCA failures.

According to certain embodiments, another method by a wireless device includes detecting a CCA failure while performing a procedure to setup or release a cell or a signal. The wireless device determines an interruption window during which the wireless device is unable to transmit or receive due to the CCA failure.

According to certain embodiments, another wireless includes processing circuitry configured to detect a CCA failure while performing a procedure to setup or release a cell or a signal. The wireless device determines an interruption window during which the wireless device is unable to transmit or receive due to the CCA failure.

Certain embodiments may provide one or more of the following technical advantages. For example, one technical advantage may be that certain embodiments perform cell reconfiguration procedures (e.g., SCell activation, PSCell addition) adaptively to NR-U. As another example, a technical advantage may be that certain embodiments provide the possibility to distinguish between known and unknown cells during cell reconfiguration in NR-U. As still another example, a technical advantage may be that certain embodiments provide consistent UE behavior when one or more phases of cell reconfiguration procedure are excessively delayed due to DL and/or UL LBT.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 1 illustrates LTE LBT and COT

FIG. 7 illustrates an example method by a wireless device, according to certain embodiments;

FIG. 8 illustrates an example virtual apparatus, according to certain embodiments;

FIG. 9 illustrates an example method by a network node, according to certain embodiments;

DETAILED DESCRIPTION

Figure 2:
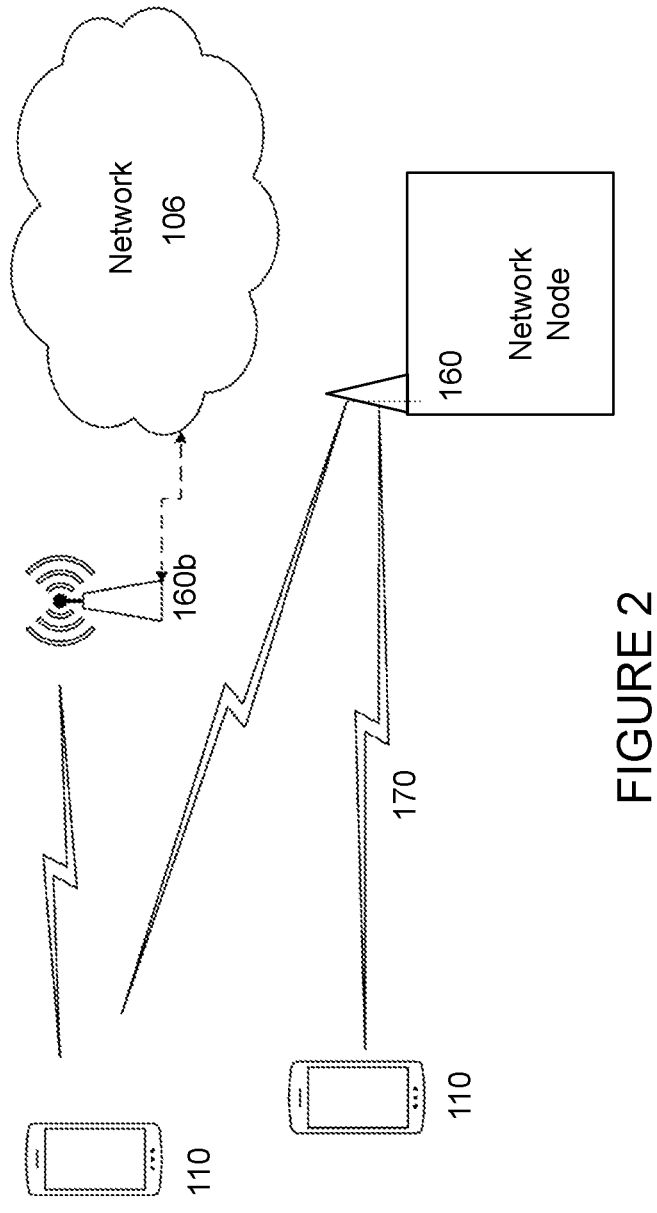
FIG. 2 illustrates an example wireless network, according to certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a more general term "network node" is used and it can correspond to any type of radio network node or any network node, which communicates with a UE and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations and Maintenance (O&M), Operations Support System (OSS), Self-Optimizing Network (SON), positioning node or location server (e.g. Evolved-Serving Mobile Location Center (E-SMLC)), Minimization of Drive Tests (MDT), test equipment (physical node or software), etc. A radio network node is network node capable of transmitting radio signals, e.g., base station, gNB, etc.

In some embodiments the non-limiting term user equipment (UE) or wireless device is used and it refers to any type of wireless device communicating with a network node and/or with another UE in a cellular or mobile communication system. Examples of UE are wireless device supporting NR, target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), drone, USB dongles, ProSe UE, V2V UE, V2X UE, etc.

The term "radio node" may refer to radio network node or UE capable of transmitting radio signals or receiving radio signals or both.

The term time resource used herein may correspond to any type of physical resource or radio resource expressed in terms of length of time or time interval or time duration. Examples of time resources are: symbol, mini-slot, time slot, subframe, radio frame, TTI, interleaving time, etc.

The term TTI used herein may correspond to any time period over which a physical channel can be encoded and interleaved for transmission. The physical channel is decoded by the receiver over the same time period (T0) over which it was encoded. The TTI may also interchangeably called as short TTI (sTTI), transmission time, slot, sub-slot, mini-slot, short subframe (SSF), mini-subframe etc.

Unless explicitly stated, the term LBT used herein may comprise DL LBT, UL LBT, or both. DL LBT may be performed by a radio network node, while UL LBT may be performed by UE, hence generically speaking LBT may be performed by a radio node. The term "LBT category" or "LBT type" refers to a set of parameters characterizing LBT procedure, including but limiting to: LBT categories described in Section 2.1, LBT with different switching delays between UL and DL (e.g., up to 16 μs, longer than 16 but shorter than 25, or 25 μs and above), beam-based LBT (LBT in a specific direction) or omni-directional LBT, different LBT approaches in frequency domain (e.g., sub-band-specific, wideband LBT over multiple continues sub-bands, wideband LBT over multiple non-contiguous sub-bands, etc.), LBT with or without shared COT (shared COT is e.g. when the COT is initiated by gNB and the transmitting within the COT without performing LBT), single-subband or multi-subband or wideband LBT.

The term LBT used herein may correspond to any type of Carrier Sensing Multiple Access (CSMA) procedure or mechanism which is performed by the node on a carrier before deciding to transmit signals on that carrier. CSMA or LBT may also interchangeably be called clear channel assessment (CCA), clear channel determination etc. The transmission of signals on a carrier subjected to LBT is also called contention-based transmission. On the other hand, the transmission of signals on a carrier which is not subject to LBT is also called contention free transmission.

The term clear channel assessment (CCA) used herein may correspond to any type of CSMA procedure or mechanism which is performed by the device on a carrier before deciding to transmit signals on that carrier. The CCA is also interchangeably called CSMA scheme, channel assessment scheme, listen-before-talk (LBT) etc. The CCA based operation is more generally called contention-based operation. The transmission of signals on a carrier subjected to CCA is also called contention-based transmission. The contention-based operation is typically used for transmission on carriers of unlicensed frequency band. But this mechanism may also be applied for operating on carriers belonging to licensed band for example to reduce interference. The transmission of signals on a carrier which is not subjected to CCA is also called contention free transmission.

LBT or CCA can be performed, e.g., by UE (prior to UL transmission) and/or base station (prior to DL transmission).

The term "COT configuration" may comprise one or more parameters characterizing the beginning of COT, length of COT, end of COT, carrier frequencies for which the COT is applicable, shared or not shared COT, fixed-length COT or variable-length COT, etc.

The term DRS is used herein to refer to one or more signals transmitted by a radio network node. DRS may comprise, e.g., SSB (defined in TS 38.133), PSS/SSS, PBCH, CSI-RS, RMSI-CORESET(s), RMSI-PDSCH(s), OSI, paging, etc. DRS may also be comprised in a pattern configuration such as SMTC or DMTC.

The term setup or release (also interchangeably called cell (re)configuration herein) procedure used herein refers to any type of procedure which requires the UE to send a feedback signal in response to receiving a setup or release message (e.g. SCell activation/deactivation command, PSCell addition/release message, cell change (e.g. handover etc.), TCI state switch command etc.). The embodiments are applicable to any type of setup or release procedure which requires the UE to send the feedback signal in response to receiving the setup or release message. Examples of the feedback signals are HARQ feedback such as ACK, Negative Acknowledgement (NACK), etc. The setup or release procedure comprises for example setting up a cell or a signal (e.g. a beam). Examples of procedures to setup or release a cell comprise for example setting up or releasing a serving cell e.g. cell change to new/target cell, SCell activation, SCell deactivation, configuration of a serving cell (e.g. SCell), direction activation of a serving cell (e.g. direct SCell activation etc.), configuration or reconfiguration of special cell (SpCell) (e.g. PSCell addition or PSCell release etc.). Examples of procedures to setup or release a signal (e.g. a beam) comprises switching a beam such as switching a TCI state etc.

The embodiments are described for NR-U. However the embodiments are applicable to any other systems with unlicensed operation such as other RAT or multi-RAT systems, where a UE receives and/or transmit signals (e.g. data) e.g. NR, LTE Frequency Division Duplex (FDD)/Time Division Duplex (TDD), LTE LAA and its enhancements, Wide Code Division Multiple Access (WCDMA)/High Speed Packet Access (HSPA), WiFi, Wide Local Area Network (WLAN), LTE, $5^{th}$ Generation (5G), etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, methods for performance by a wireless device are provided. In a particular embodiment, the wireless device may include a UE.

According to certain embodiments, the scenario may include a wireless device, such as, for example, a user equipment (UE), configured to setup or release a cell (e.g. activated SCell, PSCell addition, cell change etc.) or setup or release a signal such as a beam (e.g. TCI state switching) and in response to receiving the setup or release command (e.g. MAC CE command), the wireless device needs to send a feedback signal on the serving cell which is subject to CCA and/or the wireless device shall be capable to transmit a feedback or a valid measurement report. During these procedures, the wireless device may also need to receive signals which may also not be transmitted due to CCA failures at base stations.

For example, according to certain embodiments, a method is provided by a wireless device that includes, upon receiving a command for setting up or releasing a cell or a signal (e.g. PSCell addition, SCell activation, TCI state switch etc.), the wireless device performing the setup or release procedure over a variable time period ($T_v$), which increases with at least a number of times (N) the wireless device is unable to send a HARQ feedback to a serving cell during the time period ($T_v$) due to one or more CCA failures experienced by the UE for transmitting the signals in the serving cell. For example, there may be at least two numbers, N1 and N2(N2>IN1), of times the UE was not able to transmit due to UL CCA failure, and there are at least two corresponding time periods, Tv1 and Tv2 (Tv2>Tv1), in particular embodiments.

According to certain embodiments, the UE is configured with a maximum number of times (denoted by Nmax) the UE is allowed to miss the HARQ feedback transmission to the serving cell during the variable time period ($T_v$) i.e. N≤Nmax. Upon exceeding the maximum, e.g., when J>Nmax, then the UE is required to perform one or more operational tasks. Examples of such tasks comprise: stopping the procedure, restart the procedure, retry sending the HARQ feedback after certain delay etc. In order to ensure that the UE continues performing the procedure even if there is up to Nmax number of times CCA failures in the UL, the UE may be configured with a set of uplink resources (e.g. scheduling grant etc.) by the serving cell or based on a pre-defined rule.

The setup or release procedure may cause interruption, over an interruption period, to one or more serving cells (e.g. Primary Cell (PCell), activated SCell etc.). According to another aspect of the embodiment the UE adapts the starting time instance (Tstart) when the interruption period starts. The time instance, Tstart, comprises a variable time instance which increases with at least a number of times the UE is unable to send a HARQ feedback to the serving cell during the time over which the setup or release procedure is performed (e.g. over which the SCell is activated), e.g., there are N1<N2 and corresponding Tstart1<Tstart2.

For example, according to certain embodiments, a wireless device (such as, for example, a user equipment (UE)) performing a cell configuration procedure on a carrier frequency subject to CCA for multi-carrier operation (e.g., PSCell addition, SCell addition, S Cell activation, active TCI state switching, or active TCI state list update) adapts the cell configuration procedure to DL and/or UL CCA failures by doing the following:

Determining whether the cell being configured (e.g., PSCell being added or SCell being activated) is known or unknown based on one or more rules adapted to operation in presence of CCA failures, In one example, this step may include determining whether a least one report was sent to a network during the time T preceding the time of triggering the cell configuration procedure, where the trigger e.g. may comprise receiving a command from a network node, and where T depends on the CCA impact; if so, then the cell is considered to be known, otherwise unknown In another example, this step may include keeping track of detectability (measured by one or more radio conditions, e.g., Es/Iot) selectively only in the occasions not subject to CCA failures Depending on the determining result above, choose a first cell configuration procedure for a known cell on a carrier with CCA and choose a second cell configuration procedure for an unknown cell on a carrier with CCA Performing the chosen cell configuration procedure, while meeting one or more performance-related targets further determined for the chosen configuration procedure (a target can be, e.g., a requirement to complete the procedure with a certain time, to not create interruption in certain time intervals, to send a certain report or feedback in time, etc.) and Determining one or more thresholds characterizing the maximum allowed DL and/or UL CCA impact Any one or more of the thresholds may be pre-defined or configurable by a network node, may be determined based on a pre-defined rule or a function of one or more other parameters (e.g., measured or transmitted signal configuration such as periodicity and/or density and/or bandwidth, frequency range in which the cell configuration is performed, DRX cycle length, measurement cycle length, MGRP, DTX cycle length, method and/or the number of samples for detecting the presence of the signal to be received/measured or to determine the DL CCA failure, etc.)—for example the longer periodicity of signals or measurement patterns the lower is the threshold since the CCA impact is less tolerated when the procedure time for this configuration is long even without CCA.

Determining the actual CCA impact of one or more types, wherein each type is corresponding to the one or more determined thresholds For example, using one or more counters or timers to determine the CCA impact, e.g., to count CCA failures or missed signal receptions/measurement occasions/transmissions due to CCA failures Completing the chosen procedure if the determined actual CCA impacts (e.g., the number of measurement or SMTC or transmission occasions not available at the UE due to DL CCA failure or additional delay due to UL CCA failures) are below the corresponding determined thresholds, Abandoning the chosen procedure if the determined actual CCA impacts of one or more types are above the corresponding determined thresholds, Restarting the chosen procedure or its sub procedure if the determined actual CCA impact of a certain type is above the corresponding determined threshold; but after N restarting attempts without completion, abandoning the chosen procedure.

Restarting the selected procedure or its sub procedure if the determined actual CCA impact of a certain type is above the corresponding determined threshold; but after expiry of a timer (e.g., sCellDeactivationTimer), abandoning the selected procedure.

Selecting either of the two methods above (threshold-based or timer-based), where the selected method depends, e.g., on whether a timer value, e.g. sCellDeactivationTimer value, has been configured. If not configured, the UE abandons the selected procedure after N failed attempts, as otherwise it would continue forever; while, if configured, the UE abandons the selected procedure upon expiry of the configured timer.

The method above, where whether choosing to abandon procedure after N attempt or after expiry of a timer, depends on the value of the timer. For instance, if timer value has been configured, but is larger than a threshold (e.g. sCellDeactivation timer value 320 ms), the UE abandons the selected procedure after N failed attempts; otherwise, it abandons the selected procedure after expiry of the timer.

Transmitting a feedback (e.g., a pre-defined report or HARQ feedback), while adapting to the interruption requirement and accounting for the CCA impact, e.g., adapting the start time of the interruption such as $Tstart=X+(1+N)*T_{feedback,N}$, where N is the number of UL CCA failures (which the UE shall to count), and X is a pre-defined fixed time since the UE received a cell (re)configuration command e.g. X=1 or 2 slots.

Determining the interruption window adaptively to the outcome of the DL and/or UL CCA outcome. For example, UE determines the left and/or the time boundary of the interruption window and ensures that the interruption does not occur outside the allowed interruption window, e.g., the left boundary of the window can be $n+1+(1+N)*T_{HARQ}$ and the right boundary of the interruption window can be $n+1+(1+N)*T_{HARQ}+3$ ms$+T_{SMTC\_MAX}+T_{SMTC\_duration}$.

Examples for PSCell Addition

In presence of LBT, the wireless device may need to correctly differentiate between known and unknown states of PSCell, otherwise the PSCell may e.g. always treated as unknown which means much longer procedure delays. To adapt the known PSCell cell definition for NR-U, a few aspects need to be updated, including the time since the last measurement report, UE ability to send reports in presence of UL LBT, detectability which cannot be always guaranteed due to LBT, etc.

In one example, PSCell is known if it has been meeting the following conditions:

During the time T before the reception of the NR PSCell configuration command:

the UE has sent a valid measurement report for the NR PSCell being configured and One of the SSBs measured from the NR PSCell being configured remains detectable according to the cell identification conditions.

One of the SSBs measured from NR PSCell being configured also remains detectable during the NR PSCell configuration delay according to the cell identification conditions in the occasions where the SSB is available at the UE.

otherwise it is unknown.

The time T before the reception of the PSCell configuration command is extended to account for DL LBT, e.g., to $T_{noLBT}+L*T_{RS}+\Delta$, where $T_{noLBT}$ corresponds to the time specified for Rel-15 NR without CCA (5 seconds), L is the actual (in one example) or a maximum acceptable (in another example) number of measurement or SMTC occasions not available at the UE due to CCA which may be a fixed pre-defined or configurable number or may be based on a UE counter, $\Delta$ is the additional actual reporting delay (in one example) or a maximum acceptable delay (in another example) due to UL CCA failure and UE reattempt(s) to report at least 1 measurement for the PSCell being configured provided the UL resources are configured for the UE ($\Delta$=0 for channel access category 1), where $\Delta_{UL}$ may be a fixed pre-defined or configurable number or may be defined based on a rule as a function of one or more other parameters, or may depend on the actual number of UL transmission attempts and/or UL resource configuration for the UL transmission.

In one example, each of L and/or $\Delta$ may be defined based on a rule as a function of one or more other parameters (e.g., configuration of the measured DL and transmitted UL signal respectively such as periodicity and/or density and/or bandwidth, Discontinuous Reception (DRX) cycle length, Signal Interference to Noise Ratio (SINR), frequency range in which SCell is configured, DRX or DTX cycle length, etc.), or may depend on the actual number of DL reception and UL transmission attempts respectively, etc.

In another example, UE can also count the number of DL and/or UL CCA failures to determine L and/or $\Delta$ respectively, and calculate T to further determine whether there has been at least one measurement report, etc.

In yet another example, there can also be maximum allowed values of L and/or $\Delta$ (e.g., $L \leq L_{max}$ and/or $\Delta \leq \Delta_{max}$, respectively), which may be pre-defined or configurable. Upon exceeding $L_{max}$ or $\Delta_{max}$, the UE can consider the SCell as unknown and perform the corresponding SCell activation procedure accordingly.

In yet another example, there can also be maximum value of T, e.g., denoted by Tmax. UE can calculate T and compare to Tmax, upon exceeding Tmax, the UE can consider the SCell as unknown and perform the corresponding SCell activation procedure accordingly.

PSCell Addition Procedure Adapted to Known/Unknown SCell in NR-U

Upon receiving PSCell addition in subframe n, the UE shall be capable to transmit PRACH preamble towards PSCell no later than in subframe $n+T_{config\_PSCell}$, where $$T_{config\_PSCell}=T_{RRC\_delay}+T_{processing}+T_{search}+T_\Delta+ (T_{PSCell\_DU,ref}+\Delta_{PRACH})+2 \text{ ms},$$

Where $T_{search}$=0 for the known PSCell and $T_{search}$=(24+L1)*$T_{rs}$, $T_\Delta = T_{rs}*(1+L2)$, $L1 \leq L1_{max}$ and $L2 \leq L2_{max}$ are the corresponding numbers of measurement or SMTC occasions not available at the UE due to CCA failure, $TP_{SCell\_DU,ref}$ is the delay uncertainty in acquiring the first PRACH occasion in the PSCell without considering CCA and is up to the summation of SSB to PRACH occasion association period and 10 ms. SSB to PRACH occasion associated period is defined in Table 8.1-1 of TS 38.213, $\Delta_{PRACH} \leq \Delta_{PRACH,max}$ is the additional delay from the first PRACH occasion to the PRACH occasion where the UE can transmit, the delay is due to UL LBT failure and UE reattempt to transmit PRACH ($\Delta_{PRACH}$ may depend on the channel access category, e.g., it is 0 for channel access category 1) and hence depends on the number of UE attempts to get the channel for the transmission.

In one example, the maximum value of L1 (e.g., denoted by $L1_{max}$) can be pre-defined or configurable by a network node or determined based on a pre-defined rule or as a function of one or more other parameters (e.g., configuration of the measured DL signal respectively such as periodicity and/or density and/or bandwidth, DRX cycle length, SINR, frequency range in which PSCell is being added, SMTC periodicity, MGRP, etc.), etc.

In one further example, upon exceeding $L1_{max}$ the UE can abandon the PSCell addition procedure.

In another example, upon exceeding $L1_{max}$ the UE can restart the search, but the UE can abandon the PSCell addition after N1 unsuccessful attempts to complete the search procedure.

In another example, the maximum value of L2 (e.g., denoted by $L2_{max}$) can be pre-defined or configurable by a network node or determined based on a pre-defined rule or as a function of one or more other parameters (e.g., configuration of the measured DL signal respectively such as periodicity and/or density and/or bandwidth, DRX cycle length, SINR, frequency range in which PSCell is being added, SMTC periodicity, MGRP, etc.), etc.

In one further example, upon exceeding $L2_{max}$ the UE can abandon the PSCell addition procedure.

In another example, upon exceeding $L2_{max}$ the UE can restart the timing acquisition, but the UE can abandon the PSCell addition after N2 unsuccessful attempts to complete the timing acquisition procedure.

In another example, the maximum value of $\Delta_{PRACH}$ (e.g., denoted by $\Delta_{PRACH,max}$) can be pre-defined or configurable by a network node or determined based on a pre-defined rule or as a function of one or more other parameters (e.g., PRACH configuration such as periodicity, frequency range in which PSCell is being added, DTX cycle length, etc.)

In one further example, upon exceeding $\Delta_{PRACH,max}$ the UE can stop attempting to transmit PRACH and can abandon the PSCell addition procedure.

In another example, upon exceeding $\Delta_{PRACH,max}$ the UE can retransmit PRACH, at least when there are UL resources configured for this; bit after K times with no success the UE can stop attempting to transmit PRACH and can abandon the PSCell addition procedure.

Known/Unknown SCells Definition in NR-U

An SCell on a carrier subject to CCA is known if it has been meeting the following conditions:

During the time period T before the reception of the SCell activation command:

the UE has sent a valid measurement report for the SCell being activated and

SSB remains detectable according to the cell identification conditions in clause 9.2 and 9.3 of 3GPP TS 38.133 in the occasions where the SSB is available at the UE (e.g., not missed due to CCA)

the SSB measured during the period T also remains detectable during the SCell activation delay according to the cell identification conditions in the occasions where the SSB is available at the UE.

Otherwise the SCell is unknown.

In the above the time period T can be defined as follows:

$(5+L_{DL})$ measCycleSCell+$\Delta_{UL}$, when DRX is not configured, and max($(5+L_{DL})$ measCycleSCell, $(5+L_{DL})$ DRX cycles)+ $\Delta_{UL}$, when DRX is configured, where:

$L_{DL}$ is the actual (in one example) or a maximum acceptable (in another example) number of measurement occasions with SSBs not available at the UE due to CCA which may be a fixed pre-defined or configurable number or may be based on a UE counter, $\Delta_{UL}$ is the additional delay due to UE actual or a maximum acceptable inability to send a valid measurement report on a carrier frequency with CCA ($\Delta_{UL}=0$ for UL channel access category 1, otherwise it is >0), where $\Delta_{UL}$ may be a fixed pre-defined or configurable number, may be defined based on a rule as a function of one or more parameters, or may depend on the actual number of UL transmission attempts and/or UL resource configuration for the UL transmission.

In one example, each of $L_{DL}$ and/or $\Delta_{UL}$ may be defined based on a rule as a function of one or more other parameters (e.g., configuration of the measured DL and transmitted UL signal respectively such as periodicity and/or density and/or bandwidth, DRX cycle length, SINR, frequency range in which SCell is configured, DRX or DTX cycle length, etc.), or may depend on the actual number of DL reception and UL transmission attempts respectively, etc.

In another example, UE can also count the number of DL and/or UL CCA failures to determine $L_{DL}$ and/or $\Delta_{UL}$ respectively, and calculate T to further determine whether there has been at least one measurement report, etc.

In yet another example, there can also be maximum allowed values of $L_{DL}$ and/or $\Delta_{UL}$ (e.g., $L_{DL} \leq L_{DL,max}$ and/or $\Delta_{UL} \leq \Delta_{UL,max}$, respectively), which may be pre-defined or configurable. Upon exceeding $L_{DL,max}$ or $\Delta_{UL,max}$, the UE can consider the SCell as unknown and perform the corresponding SCell activation procedure accordingly.

In yet another example, there can also be maximum value of T, e.g., denoted by Tmax. UE can calculate T and compare to Tmax, upon exceeding Tmax, the UE can consider the SCell as unknown and perform the corresponding SCell activation procedure accordingly.

SCell Activation Procedure Adapted to Known/Unknown SCell in NR-U

Upon receiving SCell activation command in slot n, the UE shall be capable to transmit valid CSI report and apply actions related to the activation command for the SCell being activated no later than in slot $$n + \frac{T_{HARQ} + T_{activation} + T_{CSI\_Reporting}}{NR \text{ slot length}},$$

where:

$T_{HARQ}=T_{HARQ,ref}+\Delta_{HARQ}$, where $T_{HARQ,ref}$ is the timing (in ms) between DL data transmission and acknowledgement as specified in TS 38.213 [3], and $\Delta_{HARQ}$ is the delay in HARQ feedback due to UL CCA failure and UE reattempt to transmit HARQ feedback provided the resources are configured for the UE ($\Delta_{HARQ}=0$ for channel access category 1), $T_{activation\_time}$ is defined as follows (where L1, L2, and L3 are the corresponding numbers of SSB occasions not available at the UE due to CCA failure):

For a known SCell:

$T_{FirstSSB}+T_{rs}*L1+5$ ms, if the SCell measurement cycle is equal to or smaller than 160 ms, $(T_{SMTC\_MAX}+T_{rs})*(1+L2)+5$ ms, if the SCell measurement cycle is larger than 160 ms.

For an unknown SCell:

$(T_{SMTC\_MAX}+T_{rs})*(2+L3)+5$ ms, provided the SCell can be successfully detected in one attempt, $T_{CSI\_reporting}=T_{CSI\_reporting,ref}+\Delta_{CSI}$, where $T_{CSI\_reporting,ref}$ is the delay (in ms) including uncertainty in acquiring the first available downlink CSI reference resource, UE processing time for CSI reporting and uncertainty in acquiring the first available CSI reporting resources as specified in R4-1907331, WF on RRM requirements for NR-U, Ericsson, May 2019, in 3GPP TS 38.331, and $\Delta_{CSI}$ is the additional delay due to UL CCA failure and UE reattempt to transmit CSI report provided the resources are configured for the UE ($\Delta_{CSI}=0$ for channel access category 1).

The UE can maintain one or more counters and/or timers for determining any of $\Delta_{HARQ}$, L1, L2, L3, and $\Delta_{CSI}$.

In one example, there can also be a maximum value of $\Delta_{HARQ}$ (e.g., denoted by $\Delta_{HARQ,max}$) which can be pre-defined or configurable by a network node or determined based on a pre-defined rule or as a function of one or more other parameters (e.g., HARQ configuration, frequency range in which SCell is being activated, DTX cycle length, etc.)

In one further example, upon exceeding $\Delta_{HARQ,max}$ the UE can stop attempting to transmit HARQ feedback and can abandon the SCell activation procedure.

In another example, upon exceeding $\Delta_{HARQ,max}$ the UE can retransmit HARQ feedback, at least when there are UL resources configured for this; bit after K times with no success the UE can stop attempting to transmit HARQ feedback and can abandon the SCell activation procedure.

In another example, there can also be a maximum value of any of L1, L2, and L3 (e.g., denoted by $L1_{max}$, $L2_{max}$, and $L3_{max}$), which can be pre-defined or configurable by a network node or determined based on a pre-defined rule or as a function of one or more other parameters (e.g., configuration of the measured DL signal respectively such as periodicity and/or density and/or bandwidth, DRX cycle length, SINR, frequency range in which PSCell is being added, SMTC periodicity, MGRP, etc.), etc.

In one further example, upon exceeding any of $L1_{max}$, $L2_{max}$, and $L3_{max}$ the UE can stop activating the SCell and can abandon the SCell activation procedure.

In another example, upon exceeding $L1_{max}$, $L2_{max}$, and $L3_{max}$ the UE can restart the procedure related to acquiring the cell timing; but after restarting N times with no success the UE can abandon the SCell activation procedure.

In yet another example, upon exceeding $L1_{max}$, $L2_{max}$, and $L3_{max}$ the UE can restart the procedure related to acquiring the cell timing; but after expiry of sCellDeactivationTimer, the UE abandons the SCell activation procedure.

In yet another example, upon exceeding $L1_{max}$, $L2_{max}$, and $L3_{max}$ the UE can restart the procedure related to acquiring the cell timing; but after expiry of sCellDeactivationTimer and provided that the configured value is lower than a threshold (e.g. 320 ms), otherwise after N failed attempts, the UE abandons the SCell activation procedure.

In another example, there can also be a maximum value of $\Delta_{CSI}$ (e.g., denoted by $\Delta_{CSI,max}$) which can be pre-defined or configurable by a network node or determined based on a pre-defined rule or as a function of one or more other parameters (e.g., UL signal configuration such as periodicity and/or density and/or bandwidth, frequency range in which SCell is being activated, DTX cycle length, etc.)

In one further example, upon exceeding $\Delta_{CSI.max}$ the UE can stop attempting to transmit CSI report and can abandon the SCell activation procedure.

In another example, upon exceeding $\Delta_{CSI.max}$ the UE can retransmit CSI report, at least when there are UL resources configured for this; but after M times with no success the UE can abandon the SCell activation procedure.

Interruptions due to SCell activation

After sending the HARQ feedback to the serving cell the UE may cause interruption over certain time period (Tinterrupt). According to another aspect of the embodiment the UE adapts the starting time instance (Tstart) when the interruption period starts, depending on the CCA outcome. The time instance, Tstart, comprises a variable time instance which increases with at least a number of times the UE is unable to send a feedback (e.g., HARQ feedback or a pre-defined report such as a CQI report or L1-RSRP report with a pre-defined value) to the serving cell during the time over which the SCell is activated. For example:

$$T\text{start}=X+f(N,T_{feedback})$$

where

X is pre-defined time resources from the moment the UE receives the SCell activation command e.g. X is expressed in slots such as X=1 or 2.

N is the number of times the UE is unable to send the HARQ feedback during the time over which the SCell is activated or the number of UE attempts, including the last successful, to transmit the feedback; there can also be a maximum Nmax, where N≤Nmax, upon exceeding Nmax the UE may be not allowed to cause any more interruption and extend Tstart; in the latter case, the UE may decide to abandon the SCell activation in one example or restart the procedure in another example;

$T_{feedback}$ is the time from a reference time (e.g., from the previous occasion or from receiving the DL data transmission or UL transmission grant [transmitted in DL] or receiving or decoding the cell (re)configuration command or a message or information on which the UE needs to provide the feedback) to the next occasion for transmitting the feedback, e.g., to the first occasion or between the occasions, etc. In one example, the UL occasions may be equally spaced or periodic, e.g., $T_{feedback,i}=T_{feedback}$; in another example, $T_{feedback}$ may be the longest time between any two consecutive occasions, etc.

$f(N,T_{feedback})$ is a function of N and $T_{feedback}$. N is the number of missed UL transmission occasions due to UL CCA failures. $T_{feedback}$ is the time from a reference time (e.g., DL reception or decoding a message or a channel on which the UE needs to provide feedback, or a previous UL transmission occasion where the UE failed to transmit) to the next UL transmission occasion or the last UL transmission (where the UE gets the channel and transmits feedback).

$(N,T_{feedback})$ can be measured e.g. in slots.

In another example $f(N,T_{feedback})=(T_{HARQ}+\Delta_{HARQ,L})/$ slot_length, where $T_{HARQ}$ is as defined in the current specification and as also shown in some examples above, and $\Delta_{HARQ,L}$ is the additional delay after the first HARQ feedback occasion due to L missed HARQ feedback occasions until the HARQ feedback is sent in the last occasion, and slot length is the NR slot length defined in 38.211 which depends on subcarrier spacing (SCS).

In another example $f(N,T_{feedback})=\Delta_{HARQ,N}$ is the additional accumulated delay from the first UL resource to the N-th UL resource for the UE feedback due to (N−1) UL LBT failures (the accumulated delay can be a sum of individual delays between the UL resource i and the UL resource (i+1), where i=1 . . . N is the number of UL LBT failures), plus the delay between the DL transmission and the first UL resource for the feedback transmission.

In another example, $f(N,T_{feedback})$ is the additional accumulated delay from the first UL resource to the N-th UL resource for the UE feedback due to (N−1) UL LBT failures (the accumulated delay can be a sum of individual delays between the UL resource i and the UL resource (i+1), where i=1 . . . N is the number of UL LBT failures), plus the delay between the DL transmission and the first UL resource for the feedback transmission.

In another example, the UE may determine the left and/or the right time boundary of the interruption window and ensure that the interruption does not occur outside the allowed interruption window, based on $\Delta_{HARQ,N}$. In one further example, the left boundary of the window is n+1+f $(N,T_{feedback})$ and the right boundary of the interruption window is $n+1+f(N,T_{feedback})+3$ ms+$T_{SMTC\_MAX}$ $T_{SMTC\_duration}$.

In another example, the starting time of the UE interruption and the interruption window need to dynamically adapt to the UL LBT outcome. Namely, the corresponding interruptions shall not occur before slot $n+1+f(N,T_{feedback})$ and shall not occur after slot $n+1+(f(N,T_{feedback})+3$ ms+$T_{SMTC\_MAX}+T_{SMTC\_duration})$/slot_length.

Further Examples for Active TCI State Switching

In another example the UE receives a setup command to switch a TCI state on a serving cell e.g. on PCell, SCell, PSCell, SpCell etc. For example the command comprises a MAC-CE command received from the serving cell. In response to receiving the TCI state switch command, the UE sends at least one HARQ feedback signal to the serving cell which is subject to CCA for at least uplink transmission. In one example the UE is requested to switch the TCI state on a SpCell (e.g. PCell or PSCell) while it also sends the HARQ feedback on the SpCell where the SpCell is subject to CCA. In another example the UE is requested to switch the TCI state on a S Cell while it sends the HARQ feedback on the SpCell. According to the embodiment upon receiving the TCI state switch command, the UE switches the TCI state over a variable time period ($T_{TCI}$) which increases with at least a number of times the UE is unable to send a HARQ feedback to the serving cell during the time period ($T_{TCI}$) The UE nay be unable to send the HARQ feedback one or more times over $T_{TCI}$ due to one or more CCA failures experienced by the UE for transmitting the signals in the uplink. The UE is unable to transmit the HARQ feedback corresponds to that the UE has missed the transmission of the HARQ feedback signal.

The number of times the UE is unable to send the HARQ feedback to the serving cell during the time period ($T_{TCI}$) is denoted by a parameter, J. According to yet another aspect the UE is configured with a maximum number of times (denoted by Jmax) the UE is allowed to miss the HARQ feedback transmission to the serving cell during the time period ($T_{TCI}$) i.e. J≤Jmax. When J>Jmax then the UE is required to perform one or more operational tasks. Examples of such tasks comprise: stopping the TCI state switching procedure, restart the TCI state switching procedure, use the old or previous or reference TCI state (e.g. pre-defined or configured etc.) for receiving signals (e.g. PDSCH, PDCCH etc.), retry sending the HARQ feedback after certain delay etc.

The variable TCI state switching time period as function of maximum allowed number of missed HARQ feedback in the uplink allows the UE to continue the TCI state switching procedure even if there is up to Kmax number of times CCA failures in the uplink in the serving cell where HARQ is to be send.

In order to realize the above mechanism where the UE continues the TCI state switching procedure even if there is up to Jmax number of times CCA failures, the UE may be configured with a set of uplink resources (e.g. scheduling grant etc.) for enabling the UE to send the HARQ when the UE is able to send the HARQ in the serving cell e.g. when the CCA is successful in the uplink of the serving cell. The UE can be configured with a set of uplink resources by the serving cell or based on pre-defined or pre-configured information etc. The configured number of the uplink resources (e.g. time resources such as uplink slots) comprises Jmax. The resources may be in consecutive or non-consecutive time resources.

The above embodiment is described with specific examples below:

If the target TCI state is known, upon receiving PDSCH carrying MAC-CE activation command at slot n, UE shall be able to receive PDCCH on the new beam of the serving cell on which TCI state switch occurs no later than at slot:

$$n+(1+J)T_{HARQ,J}+3 \text{ ms}+TO_k*(T_{first-SSB}+T_{SSB-proc}).$$

The UE shall be able to receive on the old TCI state until slot:

$$n+(1+J)T_{HARQ,J}+3 \text{ ms}+TO_k*(T_{first-SSB}).$$

Where:

$T_{first-SSB}$ is time to first SSB transmission after TCI state command is received by the UE;

$T_{SSB-proc}$=2 ms;

$TO_k$=1 if target TCI state is not in the active TCI state list for PDSCH, 0 otherwise;

J is the number of times the UE is unable to send the HARQ feedback where J≤Jmax;

$T_{HARQ,J}$ is the timing between DL data transmission and acknowledgement (ACK) sent when the UE is able to send the ACK in Jth resource assigned for the ACH transmission.

If the target TCI state is unknown, upon receiving PDSCH carrying MAC-CE activation command at slot n, UE shall be able to receive PDCCH on the new beam of the serving cell on which TCI state switch occurs no later than at slot:

$$n+(1+J)T_{HARQ,J}+3 \text{ ms}+T_{L1-RSRP}+TO_{uk}*(T_{first-SSB}+T_{SSB-proc})$$

The UE shall be able to receive on the old TCI state until slot:

$$n+(1+J)T_{HARQ,J}+3 \text{ ms}+T_{L1-RSRP}+TO_k*(T_{first-SSB}).$$

Where:

$T_{L1-RSRP}$ is the time for L1-RSRP measurement for Rx beam refinement.

$T_{first-SSB}$ is time to first SSB transmission after MAC CE command is decoded by the UE;

$TO_{uk}$=1 for CSI-RS based L1-RSRP measurement, and 0 for SSB based L1-RSRP measurement If the target TCI state is not measured and reported by the UE prior to TCI state switching, upon receiving PDSCH carrying MAC-CE activation command at slot n, UE shall be able to receive PDCCH on the new beam of the serving cell on which TCI state switch occurs no later than at slot:

$$n+(1+J)T_{HARQ,J}+3 \text{ ms}+T_{L1-RSRP}+TO_{uk}*(T_{first-SSB}+T_{SSB-proc})$$

The UE shall be able to receive on the old TCI state until slot:

$$n+(1+J)T_{HARQ,J}+3 \text{ ms}+T_{L1-RSRP}+TO_k*(T_{first-SSB})$$

If the target TCI state is known, upon receiving PDSCH carrying MAC-CE active TCI state list update at slot n, UE shall be able to receive PDCCH to schedule PDSCH with the new TCI state no later than slot:

$$n+(1+J)T_{HARQ,J}+3 \text{ ms}+TO_k*(T_{first-SSB}+T_{SSB-proc}).$$

In the above example the TCI state is known if it has been meeting the following conditions:

TCI state switch is within 1280 ms of last transmission of the resource for beam reporting/measurement for the target TCI state The UE has sent at least 1 measurement report for the target TCI state The TCI state shall remain detectable during the TCI state switching period SNR of the TCI state is >−3 dB.

According to certain embodiments, methods for performance by a network node are also provided. The methods are as suggested above in the description relate d to the network node (e.g., wireless device). Additionally, the network node (e.g., PCell) can calculate the time needed for the wireless device (such as, for example, a UE) to complete the cell configuration procedure based on the embodiments described above, including determining of whether the cell is known or unknown. The network node can further use the calculated time to determine whether the cell configuration was completed successfully or not. If not, the network node can resend the cell configuration procedure; if yes, the network node can perform one or more operation tasks involving the configured cell (assuming successful completion of the cell configuration procedure), e.g., schedule a DL or UL transmission to the UE in the configured cell.

In another example, the network node determines when the UE can create interruptions on serving cells, where the interruptions are associated with the cell (re)configuration procedure and controlled in time by the UE adaptively to the CCA outcome. Upon determining when in time (e.g., a time window) the UE can have interruptions, the network can adapt its schedule, e.g., to avoid configuring the UE to transmit and/or receive critical signals/channels/messages/data since during the interruption time the UE is not able to receive or transmit.

FIG. 2 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 3:
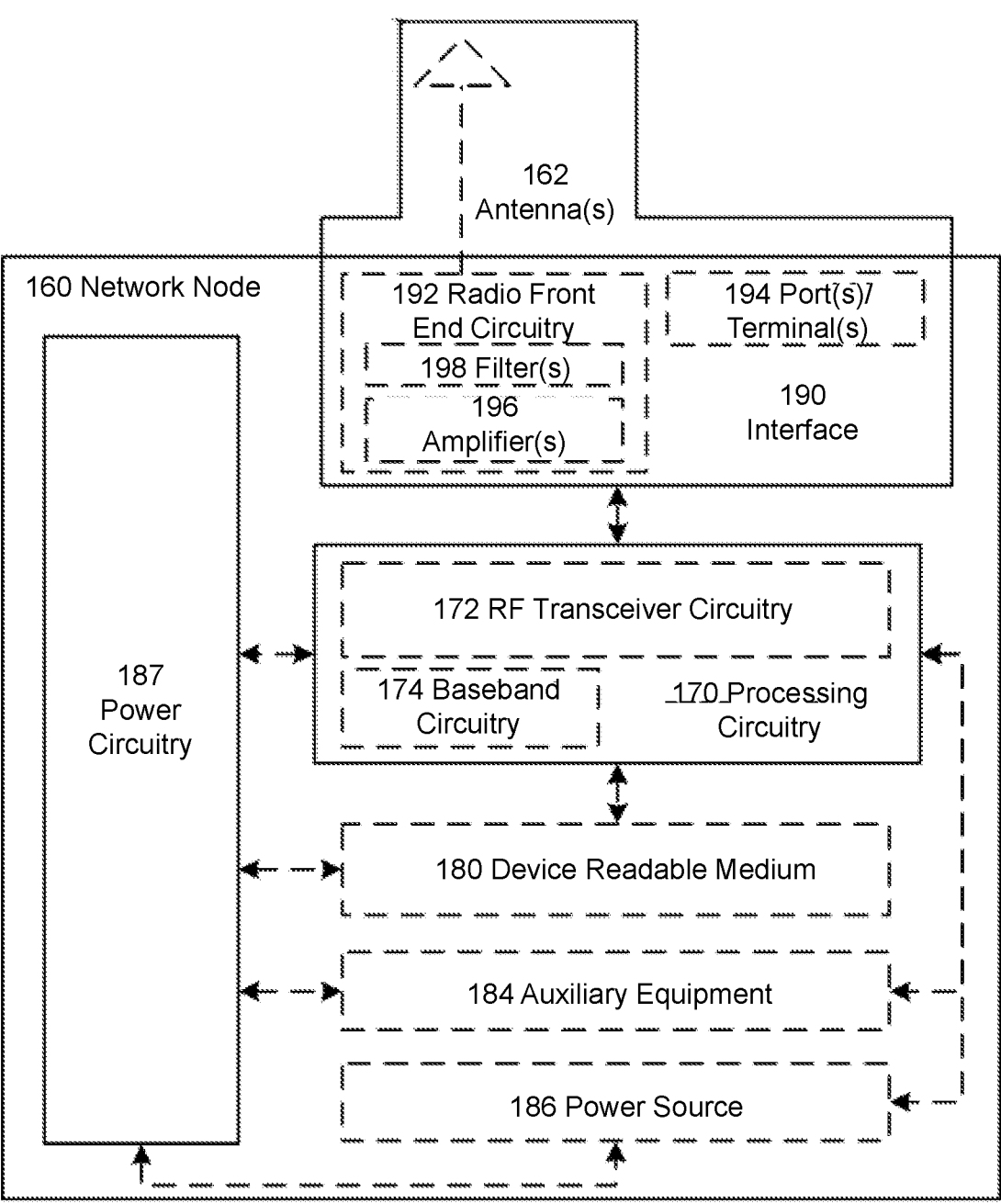
FIG. 3 illustrates an example network node, according to certain embodiments.

FIG. 3 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 4:
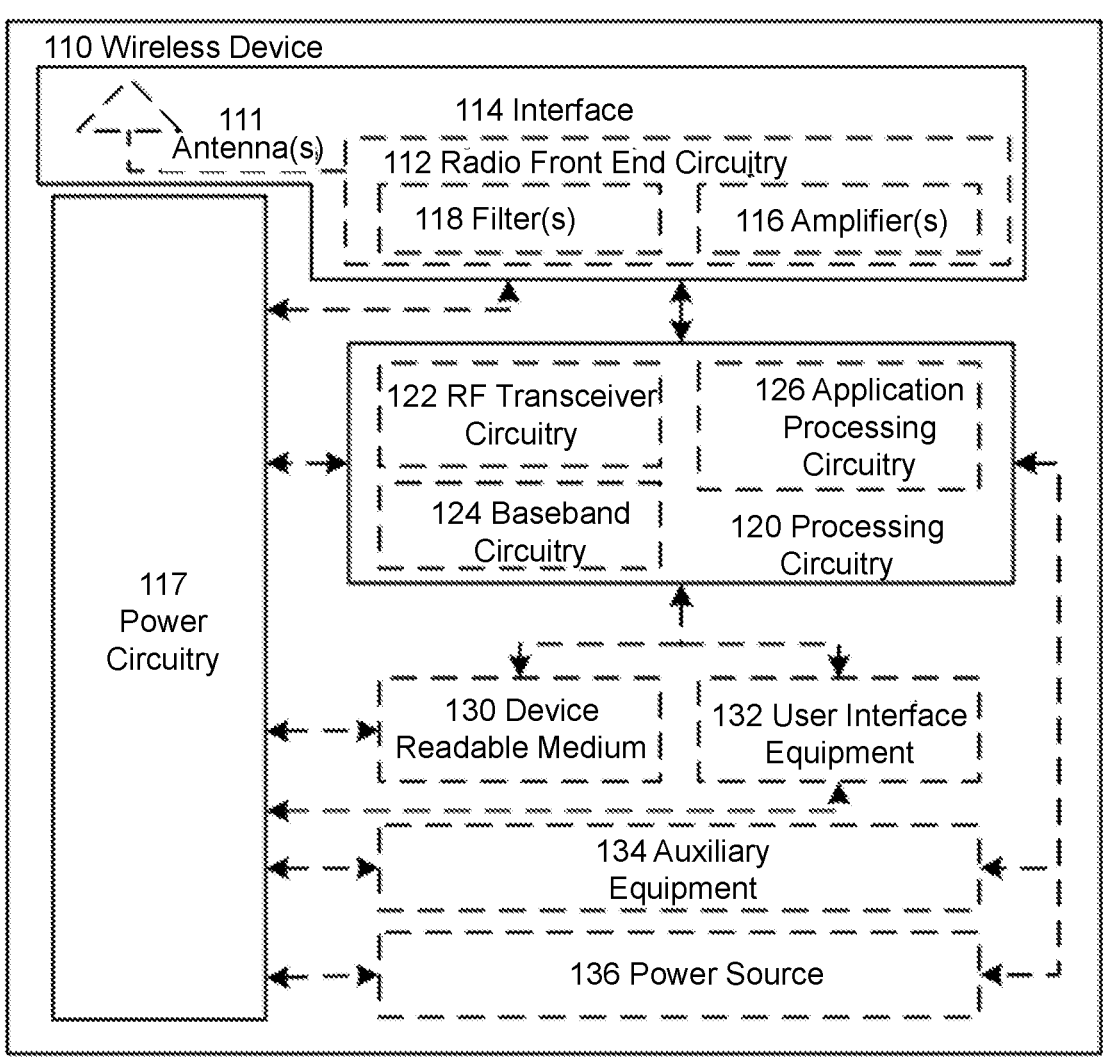
FIG. 4 illustrates an example wireless device, according to certain embodiments.

FIG. 4 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2e, vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 5:
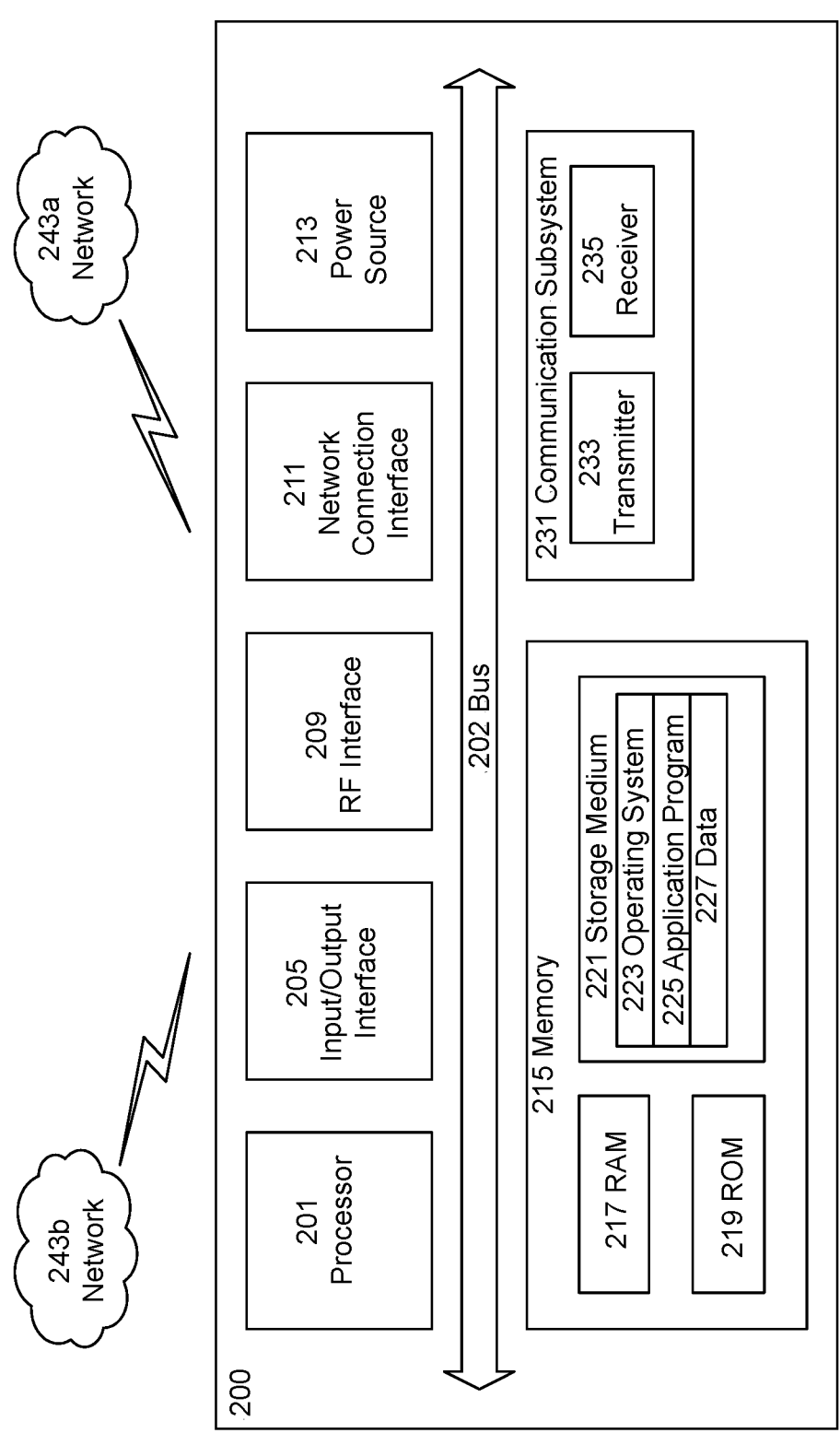
FIG. 5 illustrate an example user equipment, according to certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 3, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 5 is a UE, the components discussed herein are equally applicable to a wireless device, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, Code Division Multiplexing Access (CDMA), Wide Code Division Multiplexing Access (WCDMA), Global Satellite Management (GSM), Long Term Evolution (LTE), Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
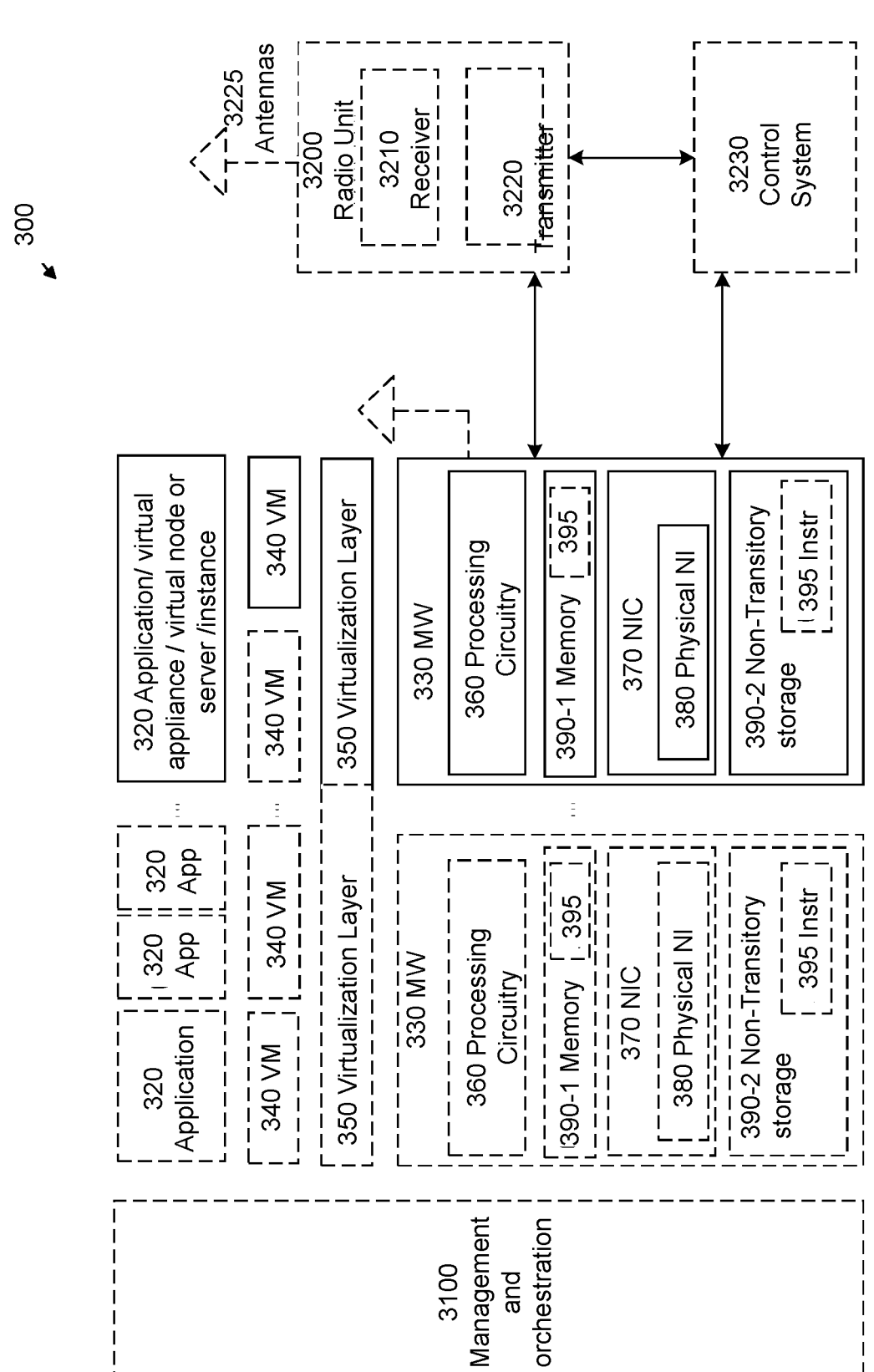
FIG. 6 illustrates a virtualization environment in which functions implemented by some embodiments may be virtualized, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

FIG. 7 depicts a method 1000 by a wireless device 110, according to certain embodiments. At step 1002, the wireless device 110 determines whether a cell associated with a clear channel assessment (CCA) failure is known or unknown. At step 1004, the wireless device 110 selects a procedure for configuring the cell associated with the CCA failure based on whether the cell is determined to be known or unknown. At step 1006, the wireless device 110 performs the procedure for configuring the cell associated with the CCA failure.

FIG. 8 illustrates a schematic block diagram of a virtual apparatus 1100 in a wireless network (for example, the wireless network shown in FIG. 2). The apparatus may be implemented in a wireless device or network node (e.g., wireless device 110 or network node 160 shown in FIG. 2). Apparatus 1100 is operable to carry out the example method described with reference to FIG. 7 and possibly any other processes or methods disclosed herein. It is also to be understood that the method of FIG. 7 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1110, selecting module 1120, performing module 1130, and any other suitable units of apparatus 1100 to perform corresponding functions according one or more embodiments of the present disclosure.

According to certain embodiments, determining module 1110 may perform certain of the determining functions of the apparatus 1100. For example, determining module 1110 may determine whether a cell associated with a clear channel assessment (CCA) failure is known or unknown.

According to certain embodiments, selecting module 1120 may perform certain of the selecting functions of the apparatus 1100. For example, selecting module 1120 may select a procedure for configuring the cell associated with the CCA failure based on whether the cell is determined to be known or unknown.

According to certain embodiments, performing module 1130 may perform certain of the performing functions of the apparatus 1100. For example, performing module 1130 may perform the procedure for configuring the cell associated with the CCA failure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 9 depicts a method 1200 by a network node 160, according to certain embodiments. At step 1202, the network node 160 detects a CCA failure. At step 1204, the network node 160 determines whether a cell associated with the CCA failure is known or unknown. At step 1206, the network node 160 selects a procedure for configuring the cell associated with the CCA failure based on whether the cell is determined to be known or unknown. At step 1208, the network node 160 transmits information associated with the procedure to the wireless device for performance of the procedure.

Figure 10:
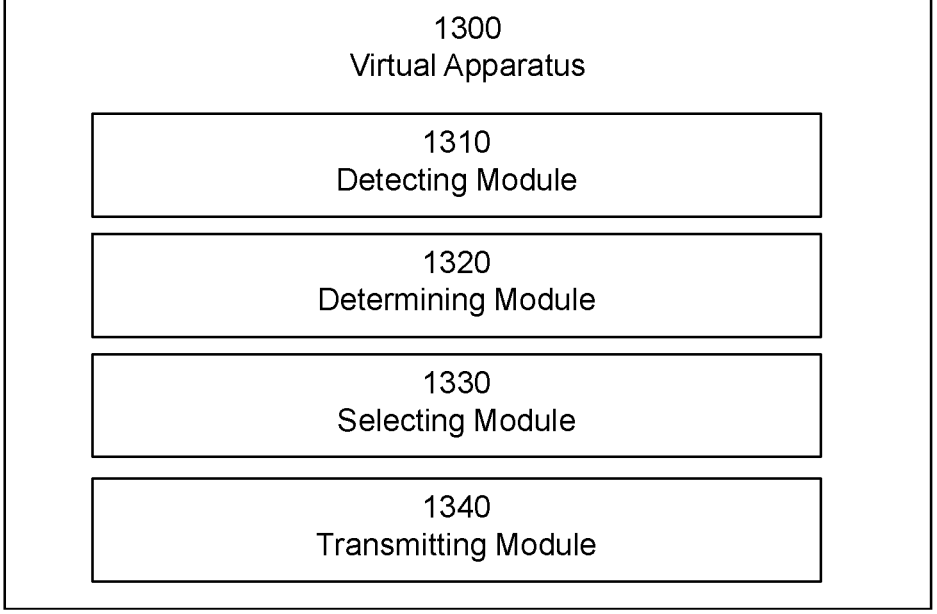
FIG. 10 illustrates another example virtual apparatus, according to certain embodiments.

FIG. 10 illustrates a schematic block diagram of a virtual apparatus 1300 in a wireless network (for example, the wireless network shown in FIG. 2). The apparatus may be implemented in a wireless device or network node (e.g., wireless device 110 or network node 160 shown in FIG. 2). Apparatus 1300 is operable to carry out the example method described with reference to FIG. 9 and possibly any other processes or methods disclosed herein. It is also to be understood that the method of FIG. 9 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause detecting module 1310, determining module 1320, selecting module 1330, and transmitting module 1340, and any other suitable units of apparatus 1300 to perform corresponding functions according one or more embodiments of the present disclosure.

According to certain embodiments, detecting module 1310 may perform certain of the detecting functions of the apparatus 1300. For example, detecting module 1310 may detect a CCA failure.

According to certain embodiments, determining module 1320 may perform certain of the determining functions of the apparatus 1300. For example, determining module 1320 may determine whether a cell associated with the CCA failure is known or unknown.

According to certain embodiments, selecting module 1330 may perform certain of the selecting functions of the apparatus 1300. For example, selecting module 1330 may select a procedure for configuring the cell associated with the CCA failure based on whether the cell is determined to be known or unknown.

According to certain embodiments, transmitting module 1320 may perform certain of the transmitting functions of the apparatus 1300. For example, transmitting module 1320 may transmit information associated with the procedure to the wireless device for performance of the procedure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figures 11, 12:
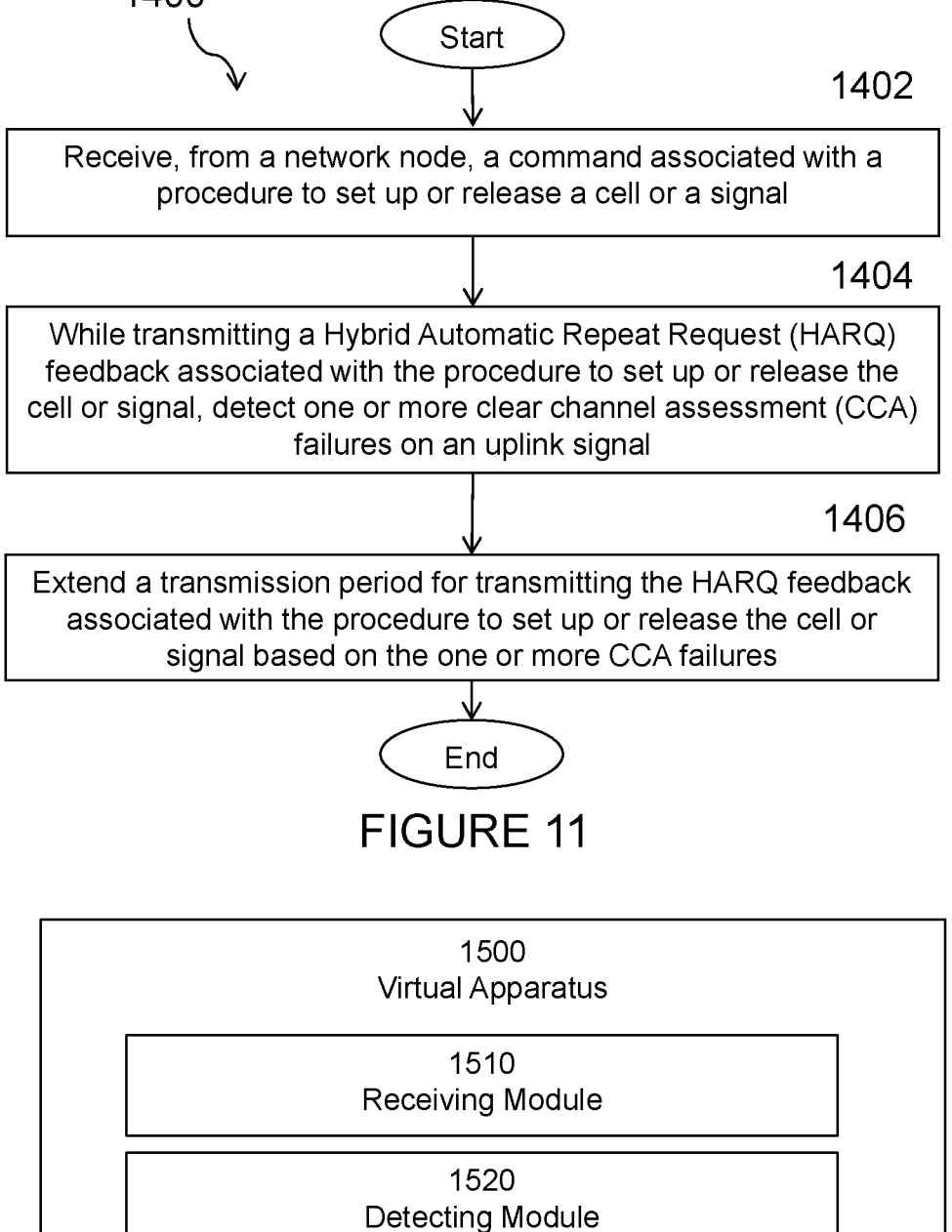
FIG. 11 illustrates another example method by a wireless device, according to certain embodiments.
FIG. 12 illustrates another example virtual apparatus, according to certain embodiments.

FIG. 11 depicts a method 1400 by a wireless device 110, according to certain embodiments. At step 1402, the wireless device 110 receives, from a network node 160, a command associated with a procedure to setup or release a cell or a signal. While transmitting a HARQ feedback associated with the procedure to setup or release the cell or signal, wireless device 110 detects one or more CCA failures on an uplink signal, at step 1404. At step 1406, the wireless device 110 extends a transmission period for transmitting the HARQ feedback associated with the procedure to setup or release the cell or signal based on the one or more CCA failures.

According to a particular embodiment, the transmission period comprises the time span for transmitting and/or attempting to transmit the HARQ feedback. The transmission period may include one or more multiple attempts.

In a particular embodiment, extending the time period duration for transmitting the HARQ feedback includes extending the time period duration based on a number of times the wireless device 110 is unable to send the HARQ feedback due to the one or more CCA failures.

In a particular embodiment, extending the transmission period for transmitting the HARQ feedback includes increasing a maximum number of times the wireless device 110 is allowed to fail to send the HARQ feedback due to the one or more CCA failures.

In a particular embodiment, extending the transmission period for transmitting the HARQ feedback includes adapting a starting time instance of an interruption period caused by the procedure.

In a particular embodiment, the HARQ feedback comprises a HARQ acknowledgement or a HARQ negative acknowledgement.

In a particular embodiment, the HARQ feedback comprises a measurement report.

In a particular embodiment, the procedure to setup or release the cell or the signal comprises a procedure for at least one of: setting up or releasing a serving cell; configuring or reconfiguring a SpCell; activating or deactivating a PSCell; activating or deactivating a SCell; switching a TCI of a beam; and updating an active TCI state list.

In a particular embodiment, detecting the one or more CCA failures on the uplink signal includes determining that the HARQ feedback was not successfully sent to the network node 160 during a time duration prior to a triggering of the procedure to setup or release the cell or the signal. In the particular embodiment, extending the transmission period for transmitting the HARQ feedback associated with the procedure includes selecting an amount of time for performing the procedure based on the HARQ feedback not being successfully sent to the network node during the time duration prior to a triggering of the procedure.

In a further particular embodiment, the amount of time is selected from a plurality of time durations based on a type of the one or more CCA failures. Each of the plurality of time durations is associated with a respective type of CCA failure.

In a particular embodiment, the amount of time is an actual reporting delay associated with the one or more CCA failures or a maximum acceptable reporting delay for the one or more CCA failures.

In a particular embodiment, the amount of time is selected based on an actual number of transmission attempts of the HARQ feedback.

In a particular embodiment, the procedure to setup or release the cell or the signal comprises transmitting a PRACH preamble towards the cell.

In a particular embodiment, the procedure to setup or release the cell or the signal comprises transmitting a CSI report.

In a particular embodiment, the wireless device 110 detects an event triggering the procedure to setup or release the cell or the signal. In a further particular embodiment, detecting the event includes receiving a command from the network node 160.

In a particular embodiment, while performing the procedure to setup or release the cell or the signal, the wireless device 110 determines a CCA impact of performing the procedure and compares the CCA impact to at least one threshold. The CCA failure is associated with one of a plurality of types of CCA failures, and a respective one of a plurality of thresholds is associated with each type of CCA failure within the plurality of types of CCA failures. In a further particular embodiment, the wireless device 110 completes the procedure if the CCA impact of performing the procedure is equal to or less than the at least one threshold, or the wireless device 110 stops the procedure if the CCA impact of performing the procedure is greater than the at least one threshold. In a further particular embodiment, the wireless device 110 restarts at least a portion of the procedure if the CCA impact of performing the procedure is equal to or greater than the at least one threshold.

In a further particular embodiment, the wireless device 110 counts a number of times at least the portion of the procedure has been restarted and abandons the procedure if the number of times is greater than a threshold.

In a particular embodiment, the wireless device 110 maintains a timer and abandons the procedure or a portion of the procedure if the timer expires.

In a particular embodiment, the cell is a PSCell.

FIG. 12 illustrates a schematic block diagram of a virtual apparatus 1500 in a wireless network (for example, the wireless network shown in FIG. 2). The apparatus may be implemented in a wireless device or network node (e.g., wireless device 110 or network node 160 shown in FIG. 2). Apparatus 1500 is operable to carry out the example method 1400 described with reference to FIG. 11 and possibly any other processes or methods disclosed herein. It is also to be understood that the method 1400 of FIG. 11 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510, detecting module 1520, extending module 1530, and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, from a network node 160, a command associated with a procedure to setup or release a cell or a signal.

According to certain embodiments, detecting module 1520 may perform certain of the detecting functions of the apparatus 1500. For example, while transmitting a HARQ feedback associated with the procedure to setup or release the cell or signal, detecting module 1520 may detect one or more CCA failures on an uplink signal.

According to certain embodiments, extending module 1530 may perform certain of the extending functions of the apparatus 1500. For example, extending module 1530 may extend a transmission period for transmitting the HARQ feedback associated with the procedure to setup or release the cell or signal based on the one or more CCA failures.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 13:
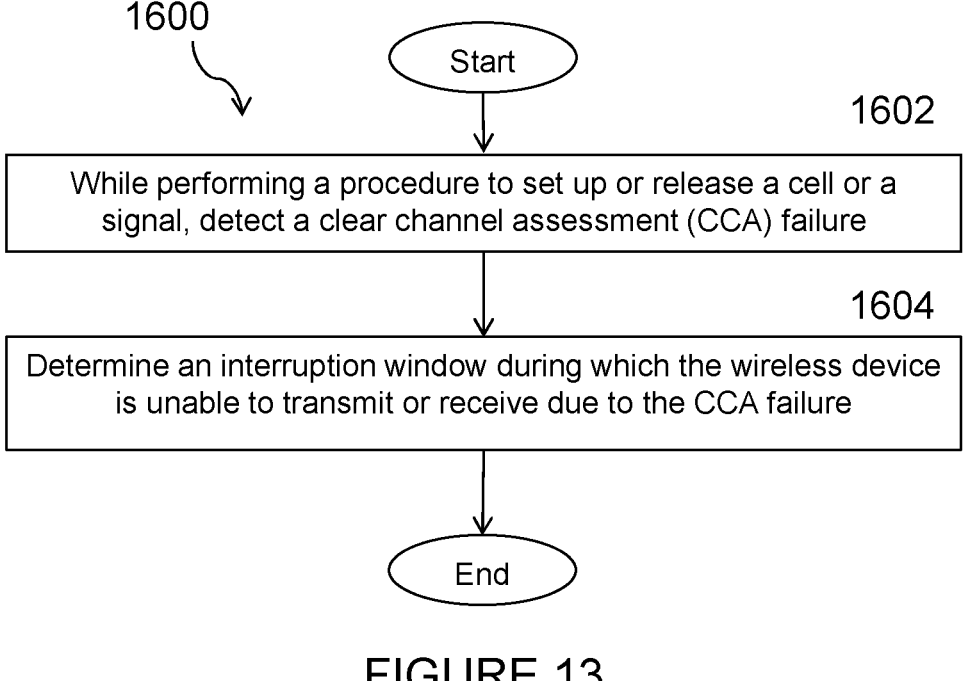
FIG. 13 illustrates another example method by a wireless device, according to certain embodiments.

FIG. 13 depicts another method 1600 by a wireless device 110, according to certain embodiments. At step 1602, while performing a procedure to setup or release a cell or a signal the wireless device 110 detects a CCA failure. At step 1604, the wireless device 110 determines an interruption window during which the wireless device 110 is unable to transmit or receive due to the CCA failure.

In a particular embodiment, the interruption window comprises an amount of time during which the wireless device is unable to transmit or receive due to the CCA failure.

In a particular embodiment, determining the interruption window includes determining at least one of a lower time boundary and a upper time boundary of the interruption window.

In a particular embodiment, the wireless device 110 determines that the interruption window does not occur outside an allowed interruption window.

In a particular embodiment, determining the interruption window includes determining at least one of a starting time and a finish time of the interruption window.

In a particular embodiment, determining the interruption window comprises determining at least one of a starting slot and an ending slot of the interruption window.

In a particular embodiment, determining the interruption window comprises adapting a starting time of the interruption window which increases with at least number of times the wireless device is unable to send a feedback signal due to the CCA failure. In a further particular embodiment, the feedback signal comprises at least one of: HARQ feedback, a CQI report, and a L1-RSRP report. In a further particular embodiment, the feedback signal includes HARQ feedback, and the wireless device 110 determines that a number of times the wireless device 110 is unable to send the HARQ feedback exceeds a threshold. The wireless device performs at least one action to not cause any more interruption. The at least one action includes abandoning the procedure due to which wireless device 110 sends the HARQ feedback and/or restarting the procedure due to which wireless device 110 sends the HARQ feedback.

Figure 14:
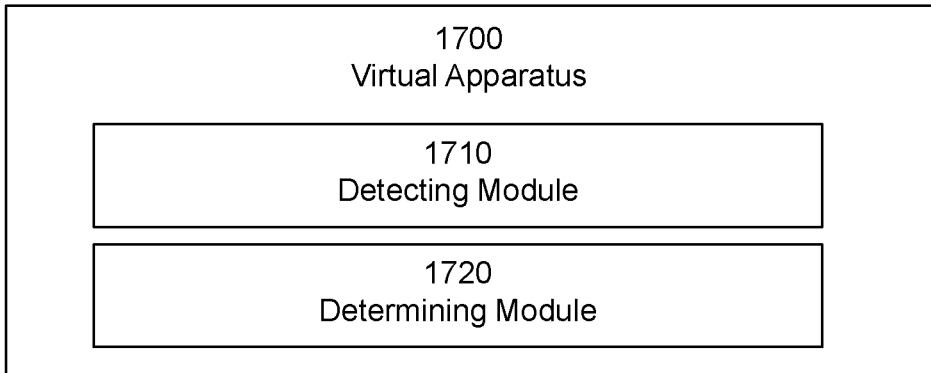
FIG. 14 illustrates another example virtual apparatus, according to certain embodiments.

FIG. 14 illustrates a schematic block diagram of a virtual apparatus 1700 in a wireless network (for example, the wireless network shown in FIG. 2). The apparatus may be implemented in a wireless device or network node (e.g., wireless device 110 or network node 160 shown in FIG. 2).

Apparatus 1700 is operable to carry out the example method 1600 described with reference to FIG. 13 and possibly any other processes or methods disclosed herein. It is also to be understood that the method 1600 of FIG. 13 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause detecting module 1710, determining module 1720, and any other suitable units of apparatus 1700 to perform corresponding functions according one or more embodiments of the present disclosure.

According to certain embodiments, detecting module 1710 may perform certain of the detecting functions of the apparatus 1700. For example, while a procedure to setup or release a cell or a signal is performed, detecting module 1710 may detect a CCA failure.

According to certain embodiments, determining module 1720 may perform certain of the determining functions of the apparatus 1700. For example, determining module 1720 may determine an interruption window during which the wireless device 110 is unable to transmit or receive due to the CCA failure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Example Embodiment 1. A method performed by a wireless device, the method comprising: determining whether a cell associated with a clear channel assessment (CCA) failure is known or unknown; selecting a procedure for configuring the cell associated with the CCA failure based on whether the cell is determined to be known or unknown; and performing the procedure for configuring the cell associated with the CCA failure.

Example Embodiment 2. The method of Example Embodiment 1, wherein the CCA failure is a downlink CCA failure.

Example Embodiment 3. The method of Example Embodiment 1, wherein the CCA failure is an uplink CCA failure.

Example Embodiment 4. The method of any one of Example Embodiments 1 to 3, wherein the procedure is for at least one of: activating or adding a primary secondary cell (PSCell); activating or adding a secondary cell (SCell);

transmission configuration indication (TCI) state switching; and updating an active TCI state list.

Example Embodiment 5. The method of any one of Example Embodiments 1 to 4, further comprising determining whether at least one report was sent to a network node during a time duration prior to a triggering of the procedure, and wherein: the cell is determined to be known if the at least one report was sent to the network node during the time duration prior to the triggering of the procedure; and the cell is determined to be unknown if the at least one report was not sent to the network node during the time duration prior to the triggering of the procedure.

Example Embodiment 6. The method of Example Embodiment 5, wherein the time duration is selected from a plurality of time durations, each of the plurality of time durations being associated with a respective type of CCA failure.

Example Embodiment 7. The method of any one of Example Embodiments 5 to 6, wherein the time duration is extended by an additional amount of time to compensate for the CCA failure.

Example Embodiment 8. The method of any one of Example Embodiments 5 to 7, further comprising extending the time duration by an additional amount of time to provide additional time for the CCA failure.

Example Embodiment 9. The method of any one of Example Embodiments 7 to 8, wherein the additional amount of time is an actual reporting delay associated with the CCA failure or a maximum acceptable reporting delay for the CCA failure.

Example Embodiment 10. The method of any one of Example Embodiments 7 to 9, wherein the additional amount of time is selected based on at least one of: a configuration (such as periodicity, density, bandwidth, DRX cycle length, SINR, frequency range, DTX cycle length, etc.) of a measured downlink signal; a configuration (such as periodicity, density, bandwidth, DRX cycle length, SINR, frequency range, DTX cycle length, etc.) of a transmitted uplink signal; an actual number of downlink or uplink transmission attempts.

Example Embodiment 11. The method of any one of Example Embodiments 5 to 10, further comprising determining that at least one SSB measured from the cell remains detectable during the time duration.

Example Embodiment 12. The method of any one of Example Embodiments 5 to 11, further comprising determining that at least on SSB measured from the cell remains detectable according to at least one cell identification condition in an occasion when the SSB is available at the wireless device (e.g., is not missed due to the CCA failure).

Example Embodiment 13. The method of any one of Example Embodiments 5 to 12, wherein the procedure comprises transmitting a PRACH preamble towards the cell.

Example Embodiment 14. The method of any one of Example Embodiments 5 to 13, wherein the procedure comprises transmitting a channel state information (CSI) report.

Example Embodiment 15. The method of any one of Example Embodiments 5 to 14, wherein the procedure comprises transmitting HARQ feedback.

Example Embodiment 16. The method of any one of Example Embodiments 5 to 15, wherein the time duration comprises an time duration associated with an interruption period caused by the CCA failure.

Example Embodiment 17. The method of any one of Example Embodiments 5 to 16, further comprising determining that the CCA failure has occurred and extending the time duration by an additional time duration that is associated with an interruption caused by the CCA failure.

Example Embodiment 18. The method of any one of Example Embodiments 1 to 17, further comprising detecting an event triggering the procedure.

Example Embodiment 19. The method of Example Embodiment 18, wherein the event comprises receiving a command from the network node.

Example Embodiment 20. The method of any one of Example Embodiments 1 to 19, wherein selecting the procedure for configuring the cell associated with the CCA failure based on whether the cell is determined to be known or unknown comprises: selecting a first cell configuration procedure if the cell is known; and selecting a second cell configuration procedure if the cell is unknown.

Example Embodiment 21. The method of any one of Example Embodiments 1 to 20, further comprising determining that at least one performance-related target is met while performing the procedure for configuring the cell associated with the CCA failure.

Example Embodiment 22. The method of Example Embodiment 21, wherein the at least one performance-related target is met if at least one of: the procedure is performed within a first time duration; the procedure is performed without creating an in interruption during a second time duration; a report or feedback is transmitted within a third time duration; the procedure is performed without exceeding a threshold associated with a maximum allowed downlink (DL) or uplink (UL) CCA impact; the procedure is performed without exceeding a maximum number of CCA failures; the procedure is performed without exceeding a maximum number of missed signal receptions; the procedure is performed without exceeding a maximum number of measurement occasions; and/or the procedure is performed without exceeding a maximum number of transmissions.

Example Embodiment 23. The method of any one of Example Embodiments 1 to 22, further comprising: while performing the procedure, determining a CCA impact of performing procedure; and comparing the CCA impact to at least one threshold.

Example Embodiment 24. The method of Example Embodiment 23, wherein the CCA failure is associated with one of a plurality of types of CCA failures, and wherein a respective one of a plurality of thresholds is associated with each type of CCA failure with in the plurality of types of CCA failures.

Example Embodiment 25. The method of any one of Example Embodiments 23 to 24, further comprising: completing the procedure if the CCA impact of performing the procedure is equal to or less than the at least one threshold; or stopping the procedure if the CCA impact of performing the procedure is greater than the at least one threshold.

Example Embodiment 26. The method of any one of Example Embodiments 24 to 25, further comprising: restarting at least a portion of the procedure if the CCA impact of performing the procedure is equal to or greater than the at least one threshold.

Example Embodiment 27. The method of Example Embodiment 26, counting a number of times at least the portion of the procedure has been restarted and abandoning the procedure if the number of times is greater than a threshold.

Example Embodiment 28. The method of any one of Example Embodiments 1 to 27, further comprising maintaining a timer and abandoning the procedure or a portion of the procedure if the timer expires.

Example Embodiment 29. The method of any one of Example Embodiments 1 to 28, wherein the cell is a PSCell.

Example Embodiment 30. A computer program comprising instructions which when executed on a computer perform any of the methods of Example Embodiments 1 to 29.

Example Embodiment 31. A computer program product comprising computer program, the computer program comprising instructions which when executed on a computer perform any of the methods of Example Embodiments 1 to 29.

Example Embodiment 32. A non-transitory computer readable medium storing instructions which when executed by a computer perform any of the methods of Example Embodiments 1 to 29.

Example Embodiment 33. A method performed by network node (such as, for example a base station), the method comprising: detecting a clear channel assessment (CCA) failure; determining whether a cell associated with the CCA failure is known or unknown; selecting a procedure for configuring the cell associated with the CCA failure based on whether the cell is determined to be known or unknown; and transmitting information associated with the procedure to the wireless device for performance of the procedure.

Example Embodiment 34. The method of Example Embodiment 33, wherein the CCA failure is a downlink CCA failure.

Example Embodiment 35. The method of Example Embodiment 33, wherein the CCA failure is an uplink CCA failure.

Example Embodiment 36. The method of any one of Example Embodiments 33 to 35, wherein the procedure is for at least one of: activating or adding a primary secondary cell (PSCell); activating or adding a secondary cell (SCell); transmission configuration indication (TCI) state switching; and updating an active TCI state list.

Example Embodiment 37. The method of any one of Example Embodiments 33 to 36, further comprising determining an amount of time that the wireless device needs to perform the procedure based on whether the cell associated with the CCA failure is known or unknown.

Example Embodiment 38. The method of any one of Example Embodiments 33 to 37, further comprising determining an amount of time for determining whether the procedure was completed successfully and using the amount of time to determine whether the procedure was completed successfully.

Example Embodiment 39. The method of Example Embodiment 38, wherein the time for determining whether the procedure was completed successfully is equal to the amount of time the wireless device needs to perform the procedure successfully.

Example Embodiment 40. The method of Example Embodiment 38, further comprising determining that the procedure was not completed successfully by the wireless device during the amount of time and retransmitting the information associated with the procedure to the wireless device.

Example Embodiment 41. The method of Example Embodiment 38, further comprising determining that the procedure was successfully completed by the wireless device during the amount of time and performing at least one operation in response to determining that the procedure was successfully completed.

Example Embodiment 42. The method of Example Embodiment 41, wherein the at least one operation includes scheduling a downlink or uplink transmission to the wireless device in the cell.

Example Embodiment 43. The method of any one of Example Embodiments 33 to 42, further comprising determining an interruption window for when the wireless device can create an interruption on the cell, wherein the interruption is associated with the procedure.

Example Embodiment 44. The method of Example Embodiment 43, further comprising adapting a schedule of the network node to avoid during the interruption window.

Example Embodiment 45. The method of any one of Example Embodiments 33 to 44, further comprising determining whether the network node received at least one report from the wireless device during a time duration prior to a triggering of the procedure, and wherein: the cell is determined to be known if the at least one report was received by the network node during the time duration prior to the triggering of the procedure; and the cell is determined to be unknown if the at least one report was not received by the network node during the time duration prior to the triggering of the procedure.

Example Embodiment 46. The method of Example Embodiment 45, wherein the time duration is selected from a plurality of time durations, each of the plurality of time durations being associated with a respective type of CCA failure.

Example Embodiment 47. The method of any one of Example Embodiments 45 to 46, wherein the time duration is extended by an additional amount of time to compensate for the CCA failure, and wherein the information transmitted to the wireless device includes the additional amount of time and/or the time duration as extended by the additional amount of time.

Example Embodiment 48. The method of any one of Example Embodiments 45 to 47, further comprising extending the time duration by an additional amount of time to provide additional time for the CCA failure, and wherein the information transmitted to the wireless device includes the additional amount of time and/or the extended time duration.

Example Embodiment 49. The method of any one of Example Embodiments 47 to 48, wherein the additional amount of time is an actual reporting delay associated with the CCA failure or a maximum acceptable reporting delay for the CCA failure.

Example Embodiment 50. The method of any one of Example Embodiments 47 to 49, wherein the additional amount of time is selected based on at least one of: a configuration (such as periodicity, density, bandwidth, DRX cycle length, SINR, frequency range, DTX cycle length, etc.) of a measured downlink signal; a configuration (such as periodicity, density, bandwidth, DRX cycle length, SINR, frequency range, DTX cycle length, etc.) of a transmitted uplink signal; an actual number of downlink or uplink transmission attempts.

Example Embodiment 51. The method of any one of Example Embodiments 45 to 50, further comprising determining that at least one SSB measured from the cell remains detectable during the time duration.

Example Embodiment 52. The method of any one of Example Embodiments 45 to 51, further comprising determining that at least on SSB measured from the cell remains detectable according to at least one cell identification condition in an occasion when the SSB is available at the wireless device (e.g., is not missed due to the CCA failure).

Example Embodiment 53. The method of any one of Example Embodiments 45 to 52, wherein the procedure comprises transmitting by the wireless device a PRACH preamble towards the cell.

Example Embodiment 54. The method of any one of Example Embodiments 45 to 53, wherein the procedure comprises transmitting a channel state information (CSI) report.

Example Embodiment 55. The method of any one of Example Embodiments 45 to 54, wherein the procedure comprises transmitting HARQ feedback.

Example Embodiment 56. The method of any one of Example Embodiments 45 to 55, wherein the time duration comprises an time duration associated with an interruption period caused by the CCA failure.

Example Embodiment 57. The method of any one of Example Embodiments 45 to 56, further comprising determining that the CCA failure has occurred and extending the time duration by an additional time duration that is associated with an interruption caused by the CCA failure.

Example Embodiment 58. The method of any one of Example Embodiments 33 to 57, further comprising transmitting a command from the network node to trigger the procedure.

Example Embodiment 59. The method of any one of Example Embodiments 33 to 58, wherein selecting the procedure for configuring the cell associated with the CCA failure based on whether the cell is determined to be known or unknown comprises: selecting a first cell configuration procedure if the cell is known; and selecting a second cell configuration procedure if the cell is unknown.

Example Embodiment 60. The method of any one of Example Embodiments 33 to 59, further comprising determining that at least one performance-related target is met while performing the procedure for configuring the cell associated with the CCA failure.

Example Embodiment 61. The method of Example Embodiment 60, wherein the at least one performance-related target is met if at least one of: the procedure is performed within a first time duration; the procedure is performed without creating an in interruption during a second time duration; a report or feedback is transmitted within a third time duration; the procedure is performed without exceeding a threshold associated with a maximum allowed downlink (DL) or uplink (UL) CCA impact; the procedure is performed without exceeding a maximum number of CCA failures; the procedure is performed without exceeding a maximum number of missed signal receptions; the procedure is performed without exceeding a maximum number of measurement occasions; and/or the procedure is performed without exceeding a maximum number of transmissions.

Example Embodiment 62. The method of any one of Example Embodiments 33 to 61, further comprising: determining a CCA impact of performing procedure; and comparing the CCA impact to at least one threshold.

Example Embodiment 63. The method of Example Embodiment 62, wherein the CCA failure is associated with one of a plurality of types of CCA failures, and wherein a respective one of a plurality of thresholds is associated with each type of CCA failure with in the plurality of types of CCA failures.

Example Embodiment 64. The method of any one of Example Embodiments 62 to 63, further comprising: configuring the wireless device to complete the procedure if the CCA impact of performing the procedure is equal to or less than the at least one threshold; or configuring the wireless device to stop the procedure if the CCA impact of performing the procedure is greater than the at least one threshold.

Example Embodiment 65. The method of any one of Example Embodiments 62 to 63, further comprising configuring the wireless device to restart at least a portion of the procedure if the CCA impact of performing the procedure is equal to or greater than the at least one threshold.

Example Embodiment 66. The method of any one of Example Embodiments 62 to 63, further comprising configuring the wireless device to count a number of times at least the portion of the procedure has been restarted and abandon the procedure if the number of times is greater than a threshold.

Example Embodiment 67. The method of any one of Example Embodiments 33 to 66, further comprising configuring the wireless device to maintain a timer and abandoning the procedure or a portion of the procedure if the timer expires.

Example Embodiment 68. The method of any one of Example Embodiments 62 to 63, further comprising: transmitting a signal indicating that the wireless device is to complete the procedure if the CCA impact of performing the procedure is equal to or less than the at least one threshold; or transmitting a signal indicating that the wireless device to stop the procedure if the CCA impact of performing the procedure is greater than the at least one threshold.

Example Embodiment 69. The method of any one of Example Embodiments 62 to 63, further comprising transmitting a signal indicating that the wireless device is to restart at least a portion of the procedure if the CCA impact of performing the procedure is equal to or greater than the at least one threshold.

Example Embodiment 70. The method of any one of Example Embodiments 62 to 63, further comprising transmitting a signal indicating that the wireless device is abandon the procedure if a number of times that at least the portion of the procedure has been restarted is greater than a threshold.

Example Embodiment 71. The method of any one of Example Embodiments 33 to 70, further comprising transmitting a signal to the wireless device to indicate that the procedure is to be abandoned if a timer expires.

Example Embodiment 72. A computer program comprising instructions which when executed on a computer perform any of the methods of Example Embodiments 33 to 71.

Example Embodiment 73. A computer program product comprising computer program, the computer program comprising instructions which when executed on a computer perform any of the methods of Example Embodiments 33 to 71.

Example Embodiment 74. A non-transitory computer readable medium storing instructions which when executed by a computer perform any of the methods of embodiments 33 to 71.

Example Embodiment 75. A method performed by a wireless device, the method comprising: detecting a clear channel assessment (CCA) failure; and extending a time duration for performing a procedure by an amount of time based on the CCA failure.

Example Embodiment 76. The method of Example Embodiment 75, further comprising: determining whether a cell associated with the CCA failure is known or unknown; and determining an amount of time associated with the time duration based on the whether the CCA failure is known or unknown.

Example Embodiment 77. The method of any one of Example Embodiments 75 to 76, further comprising performing the procedure within the extended duration.

Example Embodiment 78. The method of any one of Example Embodiments 75 to 77, wherein the CCA failure is a downlink CCA failure.

Example Embodiment 79. The method of any one of Example Embodiments 75 to 77, wherein the CCA failure is an uplink CCA failure.

Example Embodiment 80. The method of any one of Example Embodiments 75 to 79, wherein the procedure is for at least one of: activating or adding a primary secondary cell (PSCell); activating or adding a secondary cell (SCell); transmission configuration indication (TCI) state switching; and updating an active TCI state list.

Example Embodiment 81. The method of any one of Example Embodiments 75 to 80, further comprising determining whether at least one report was sent to a network node during a time duration prior to a triggering of the procedure, and selecting the amount of time for performing the procedure based on whether the at least one report was sent to the network node during a time duration.

Example Embodiment 82. The method of Example Embodiment 81, wherein the amount of time is selected from a plurality of time durations, each of the plurality of time durations being associated with a respective type of CCA failure.

Example Embodiment 83. The method of any one of Example Embodiments 75 to 82, wherein the amount of time is an actual reporting delay associated with the CCA failure or a maximum acceptable reporting delay for the CCA failure.

Example Embodiment 84. The method of any one of Example Embodiments 75 to 83, wherein the amount of time is selected based on at least one of: a configuration (such as periodicity, density, bandwidth, DRX cycle length, SINR, frequency range, DTX cycle length, etc.) of a measured downlink signal; a configuration (such as periodicity, density, bandwidth, DRX cycle length, SINR, frequency range, DTX cycle length, etc.) of a transmitted uplink signal; an actual number of downlink or uplink transmission attempts.

Example Embodiment 85. The method of any one of Example Embodiments 75 to 84, further comprising determining that at least one SSB measured from the cell remains detectable during the time duration.

Example Embodiment 86. The method of any one of Example Embodiments 75 to 85, further comprising determining that at least on SSB measured from the cell remains detectable according to at least one cell identification condition in an occasion when the SSB is available at the wireless device (e.g., is not missed due to the CCA failure).

Example Embodiment 87. The method of any one of Example Embodiments 75 to 86, wherein the procedure comprises transmitting a PRACH preamble towards the cell.

Example Embodiment 88. The method of any one of Example Embodiments 75 to 87, wherein the procedure comprises transmitting a channel state information (CSI) report.

Example Embodiment 89. The method of any one of Example Embodiments 75 to 88, wherein the procedure comprises transmitting HARQ feedback.

Example Embodiment 90. The method of any one of Example Embodiments 75 to 89, wherein the amount of time is associated with an interruption period caused by the CCA failure.

Example Embodiment 91. The method of any one of Example Embodiments 75 to 90, further comprising detecting an event triggering the procedure.

Example Embodiment 92. The method of Example Embodiment 91, wherein the event comprises receiving a command from the network node.

Example Embodiment 93. The method of any one of Example Embodiments 75 to 92, further comprising determining that at least one performance-related target is met while performing the procedure for configuring the cell associated with the CCA failure.

Example Embodiment 93. The method of Example Embodiment 93, wherein the at least one performance-related target is met if at least one of: the procedure is performed within a first time duration; the procedure is performed without creating an in interruption during a second time duration; a report or feedback is transmitted within a third time duration; the procedure is performed without exceeding a threshold associated with a maximum allowed downlink (DL) or uplink (UL) CCA impact; the procedure is performed without exceeding a maximum number of CCA failures; the procedure is performed without exceeding a maximum number of missed signal receptions; the procedure is performed without exceeding a maximum number of measurement occasions; and/or the procedure is performed without exceeding a maximum number of transmissions.

Example Embodiment 97. The method of any one of Example Embodiments 75 to 96, further comprising: while performing the procedure, determining a CCA impact of performing procedure; and comparing the CCA impact to at least one threshold.

Example Embodiment 98. The method of Example Embodiment 97, wherein the CCA failure is associated with one of a plurality of types of CCA failures, and wherein a respective one of a plurality of thresholds is associated with each type of CCA failure with in the plurality of types of CCA failures.

Example Embodiment 99. The method of any one of Example Embodiments 97 to 98, further comprising: completing the procedure if the CCA impact of performing the procedure is equal to or less than the at least one threshold; or stopping the procedure if the CCA impact of performing the procedure is greater than the at least one threshold.

Example Embodiment 100. The method of any one of Example Embodiments 97 to 98, further comprising: restarting at least a portion of the procedure if the CCA impact of performing the procedure is equal to or greater than the at least one threshold.

Example Embodiment 101. The method of Example Embodiment 100, further comprising counting a number of times at least the portion of the procedure has been restarted and abandoning the procedure if the number of times is greater than a threshold.

Example Embodiment 102. The method of any one of Example Embodiments 75 to 101, further comprising maintaining a timer and abandoning the procedure or a portion of the procedure if the timer expires.

Example Embodiment 103. The method of any one of Example Embodiments 75 to 102, wherein the cell is a PSCell.

Example Embodiment 104. A computer program comprising instructions which when executed on a computer perform any of the methods of Example Embodiments 75 to 103.

Example Embodiment 105. A computer program product comprising computer program, the computer program comprising instructions which when executed on a computer perform any of the methods of Example Embodiments 75 to 103.

Example Embodiment 106. A non-transitory computer readable medium storing instructions which when executed by a computer perform any of the methods of Example Embodiments 75 to 103.

Example Embodiment 107. A method performed by a network node, the method comprising: detecting a clear channel assessment (CCA) failure; and extending a time duration for performing a procedure by an amount of time based on the CCA failure; and transmitting information indicating the time duration for performing the procedure to a wireless device.

Example Embodiment 108. The method of Example Embodiment 108, further comprising determining whether a cell associated with the CCA failure is known or unknown; and determining an amount of time associated with the time duration based on the whether the CCA failure is known or unknown.

Example Embodiment 109. The method of any one of Example Embodiments 107 to 108, further comprising performing the procedure within the extended duration.

Example Embodiment 110. The method of any one of Example Embodiments 107 to 109, wherein the CCA failure is a downlink CCA failure.

Example Embodiment 111. The method of any one of Example Embodiments 107 to 109, wherein the CCA failure is an uplink CCA failure.

Example Embodiment 112. The method of any one of Example Embodiments 107 to 111, wherein the procedure is for at least one of: activating or adding a primary secondary cell (PSCell); activating or adding a secondary cell (SCell); transmission configuration indication (TCI) state switching; and updating an active TCI state list.

Example Embodiment 113. The method of any one of Example Embodiments 107 to 112, further comprising determining whether at least one report was sent to the network node during a time duration prior to a triggering of the procedure, and selecting the amount of time for performing the procedure based on whether the at least one report was sent to the network node during a time duration.

Example Embodiment 114. The method of Example Embodiment 113, wherein the amount of time is selected from a plurality of time durations, each of the plurality of time durations being associated with a respective type of CCA failure.

Example Embodiment 115. The method of any one of Example Embodiments 107 to 114, wherein the amount of time is an actual reporting delay associated with the CCA failure or a maximum acceptable reporting delay for the CCA failure.

Example Embodiment 116. The method of any one of Example Embodiments 107 to 114, wherein the amount of time is selected based on at least one of: a configuration (such as periodicity, density, bandwidth, DRX cycle length, SINR, frequency range, DTX cycle length, etc.) of a measured downlink signal; a configuration (such as periodicity, density, bandwidth, DRX cycle length, SINR, frequency range, DTX cycle length, etc.) of a transmitted uplink signal; an actual number of downlink or uplink transmission attempts.

Example Embodiment 117. The method of any one of Example Embodiments 107 to 116, further comprising determining that at least one SSB measured from the cell remains detectable during the time duration.

Example Embodiment 118. The method of any one of Example Embodiments 107 to 117, further comprising determining that at least on SSB measured from the cell remains detectable according to at least one cell identification condition in an occasion where the SSB is available at the wireless device (e.g., is not missed due to the CCA failure).

Example Embodiment 119. The method of any one of Example Embodiments 107 to 118, wherein the procedure comprises transmitting a PRACH preamble towards the cell.

Example Embodiment 120. The method of any one of Example Embodiments 107 to 119, wherein the procedure comprises transmitting a channel state information (CSI) report.

Example Embodiment 121. The method of any one of Example Embodiments 107 to 120, wherein the procedure comprises transmitting HARQ feedback.

Example Embodiment 122. The method of any one of Example Embodiments 107 to 121, wherein the amount of time is associated with an interruption period caused by the CCA failure.

Example Embodiment 123. The method of any one of Example Embodiments 107 to 122, further comprising detecting an event triggering the procedure.

Example Embodiment 124. The method of Example Embodiment 123, wherein the event comprises receiving a command from the network node.

Example Embodiment 125. The method of any one of Example Embodiments 107 to 124, further comprising determining that at least one performance-related target is met while performing the procedure for configuring the cell associated with the CCA failure.

Example Embodiment 126. The method of Example Embodiment 125, wherein the at least one performance-related target is met if at least one of: the procedure is performed within a first time duration; the procedure is performed without creating an in interruption during a second time duration; a report or feedback is transmitted within a third time duration; the procedure is performed without exceeding a threshold associated with a maximum allowed downlink (DL) or uplink (UL) CCA impact; the procedure is performed without exceeding a maximum number of CCA failures; the procedure is performed without exceeding a maximum number of missed signal receptions; the procedure is performed without exceeding a maximum number of measurement occasions; and/or the procedure is performed without exceeding a maximum number of trans-missions.

Example Embodiment 127. The method of any one of Example Embodiments 107 to 126, further comprising: determining a CCA impact of performing procedure; and comparing the CCA impact to at least one threshold.

Example Embodiment 128. The method of Example Embodiment 127, wherein the CCA failure is associated with one of a plurality of types of CCA failures, and wherein a respective one of a plurality of thresholds is associated with each type of CCA failure with in the plurality of types of CCA failures.

Example Embodiment 129. The method of any one of Example Embodiments 107 to 128, further comprising: configuring the wireless device to complete the procedure if the CCA impact of performing the procedure is equal to or less than the at least one threshold; or configuring the wireless device to stop the procedure if the CCA impact of performing the procedure is greater than the at least one threshold.

Example Embodiment 130. The method of any one of Example Embodiments 107 to 128, further comprising: configuring the wireless device to restart at least a portion of the procedure if the CCA impact of performing the procedure is equal to or greater than the at least one threshold.

Example Embodiment 131. The method of Example Embodiment 130, further comprising configuring the wireless device to count a number of times at least the portion of the procedure has been restarted and abandon the procedure if the number of times is greater than a threshold.

Example Embodiment 132. The method of any one of Example Embodiments 107 to 131, further comprising con-figuring the wireless device to maintain a timer and aban-doning the procedure or a portion of the procedure if the timer expires.

Example Embodiment 133. The method of any one of Example Embodiments 107 to 132, wherein the cell is a PSCell.

Example Embodiment 134. A computer program com-prising instructions which when executed on a computer perform any of the methods of Example Embodiments 107 to 133.

Example Embodiment 135. A computer program product comprising computer program, the computer program com-prising instructions which when executed on a computer perform any of the methods of Example Embodiments 107 to 133.

Example Embodiment 136. A non-transitory computer readable medium storing instructions which when executed by a computer perform any of the methods of Example Embodiments 107 to 133.

Example Embodiment 137. A wireless device for improv-ing network efficiency, the wireless device comprising: processing circuitry configured to perform any of the steps of any of Example Embodiments 1 to 26 and 75 to 106; and power supply circuitry configured to supply power to the wireless device.

Example Embodiment 138. A base station for improving network efficiency, the base station comprising: processing circuitry configured to perform any of the steps of any of Example Embodiments 27 to 74 and 107 to 136; power supply circuitry configured to supply power to the wireless device.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Additional Information

Section A

In R4-1910551, WF on RRM requirements for NR-U, Ericsson, Qualcomm Inc., Nokia, Nokia Shanghai Bell, August 2019, the following has been agreed [1] on the active TCI state switching and active TCI state list update for NR-U in RAN4 #92:

The known TCI state definition needs to be updated for NR-U

Failure to receive DRS due to DL LBT failure, results in a longer time necessary to complete the active TCI state switching In the TCI requirements limit the maximum acceptable number of missed DRS occasions due to LBT FFS on UE behavior if the maximum acceptable number is exceeded Failure to transmit ACK due to UL LBT failure (when the ACK is transmitted on unlicensed carrier) may result in a longer procedure delay due to UE re-attempt to transmit Herein, we further discuss the active TCI state switching requirements for NR-U.

TCI Switching in NR: TCI state describes QCL relation for a reference signal or SSB and CORESET/PDSCH configured in a specific cell with cell ID within a specific bandwidth part with BWP ID. An NR UE can be configured with one or more TCI state configurations on serving cell in MR-DC or standalone NR. There can be one or more active TCI states in the active TCI states list, and the UE can perform active TCI state switching upon different triggers (e.g., RRC-based switching, MAC CE based switching, DCI-base switching).

There are two types of requirements related to TCI states:

Active TCI state switching delay, and

Active TCI state list update.

Switching to a Known TCI State

MAC-CE based TCI state switching: the UE is required to receive PDCCH using the new TCI state (after switching or the active TCI state list update) in $$\text{slot } n+T_{HARQ}+3 \text{ ms}+TO_k*(T_{first-SSB}+T_{SSB-proc}),$$

and receive PDCCH using the old TCI state until $$\text{slot } n+T_{HARQ}+3 \text{ ms}+TO_k*(T_{first-SSB}),$$

when a PDSCH carrying MAC-CE is received in slot n. The 3 ms added is for decoding of the MAC message, which is carried out after decoding PDSCH.

For RRC based TCI state switching: the UE is required to receive PDCCH using the new TCI state in $$\text{slot } n+T_{RRC\_processing}+TO_k*(T_{first-SSB}+T_{SSB-proc}),$$

when a PDSCH carrying the RRC message is received in slot n. There is no requirement on receiving PDCCH using the old TCI state during the switching period.

In the above:

$TO_k=0$ when the target TCI state is in the list of active TCI states for PDSCH, and $TO_k=1$ otherwise (UE needs to synchronize to SSB before starting reception on PDCCH using the new TCI state);

$T_{first-SSB}$ and $T_{SSB-proc}$ is the time between reception of TCI switching command and the first available SSB associated with the target TCI state, and the time for processing of said SSB;

$T_{HARQ}$ is the time between reception of a PDSCH transport block and transmission by the UE to the network node of an ACK or NACK on successful or unsuccessful decoding of said transport block;

$T_{RRC\_processing}$ is the time between receiving PDSCH with RRC message and having fully decoded RRC message.

DCI based TCI state switching (target TCI state must be a part of the active TCI states list): the UE has to switch to the new TCI state without first synchronizing to an SSB associated with the target TCI state but needs time (time- DurationForQCL, specified in TS 38.306) to perform PDCCH reception and apply spatial QCL information received in DCI.

Switching to an Unknown TCI State

MAC-CE based switching: UE is required to receive PDCCH using the new TCI state in $$\text{slot } n+T_{HARQ}+3 \text{ ms}+T_{L1-ASAP}+TO_{uk}*(T_{first-SSB}+T_{SSB-proc}),$$

and receive PDCCH using the old TCI state until $$\text{slot } n+T_{HARQ}+3 \text{ ms}+T_{L1-ASAP}+TO_{uk}*(T_{first-SSB}),$$

when a PDSCH carrying MAC-CE is received in slot n.

RRC based switching: UE is required to receive PDCCH using the new TCI state in $$\text{slot } n+T_{RRC\_processing}+T_{L1-RSRP}+TO_{uk}*(T_{first-SSB}+T_{SSB-proc})$$

There is no requirement on receiving PDCCH using the old TCI state during the switching.

For the unknown case, the UE performs also L1-RSRP measurements (during $T_{L1-RSRP}$) on SSBs or CSI-RS depending on the configuration provided by the network node. If the L1-RSRP is on CSI-RS, the UE needs additional time for synchronizing to SSB before being ready to receive PDCCH using the new TCI state (hence $TO_{uk}=0$ for SSB-based L1-RSRP, and $TO_{uk}=1$ for CSI-RS L1-RSRP).

Known TCI State Definition in NR-U

In NR-U, SSBs may still be transmitted via different beams and the UE may be configured with multiple states, hence the TCI state switching requirements are also needed in NR-U where LBT may be performed in DL or in DL and UL by the respective nodes.

In presence of LBT, the UE needs to correctly differentiate between known and unknown states and also complete the active TCI state switching and list update procedures within specified delays.

In TS 38.133, the TCI state is known if it has been meeting the following conditions:

TCI state switch command is received within [1280] ms of the last transmission of the RS resource for beam reporting or measurement for the target TCI state The UE has sent at least 1 measurement report for the target TCI state The TCI state remain detectable during the TCI state switching period The SSB associated with the TCI state remain detectable during the TCI switching period SNR of the TCI state is ≥−3 dB Otherwise, the TCI state is unknown.

To adapt the known TCI state definition for NR-U, a few aspects need to be updated, including the time since the last transmission or measurement of the target TCI state, UE ability to send reports in presence of UL LBT, detectability which cannot be always guaranteed due to LBT, etc.

Proposal 1: TCI state remains detectable during the TCI switching period meeting the SNR of the TCI state condition, which is ≥−3 dB, in the occasions where the SSB is available at the UE.

Proposal 2: The maximum time between receiving of the TCI state switching command and the last transmission of the RS resource for beam reporting or measurement for the target TCI state is extended, e.g., [1280]+ $L*T_{SSB}$ ms+Δ, where L is the number of measurement occasions with SSBs not available at the UE due to CCA, and Δ is the reporting delay due to UL LBT failure and UE reattempt to report at least 1 measurement for the target TCI state provided the UL resources are configured for the UE ($\Delta=0$ for channel access category 1).

Proposal 3: The maximum values of L and A are TBD, upon exceeding which the UE shall assume the TCI state is unknown.

Active TCI State Switching in NR-U for a Known Cell

MAC-CE Based Switching

The UE is required to receive PDCCH using the new TCI state (after switching or the active TCI state list update) in $$\text{slot } n+(T_{HARQ,ref}+\Delta_{HARQ})+3 \text{ ms}+TO_k*(T_{first-SSB}+T_{SSB-proc}+T_{SSB}*L_{MAC,known}),$$

and receive PDCCH using the old TCI state until $$\text{slot } n+(T_{HARQ,ref}+\Delta_{HARQ})+3 \text{ ms}+TO_k*(T_{first-SSB}+T_{SSB}*L_{MAC,known}),$$

when a PDSCH carrying MAC-CE is received in slot n, where:

3 ms are added is for decoding of the MAC message, which is carried out after decoding PDSCH, $T_{HARQ,ref}$ is the time between reception of a PDSCH transport block and transmission by the UE to the network node of an ACK or NACK on successful or unsuccessful decoding of said transport block as specified in TS 38.213 [3], $\Delta_{HARQ}$ is the delay in HARQ feedback due to UL LBT failure and UE reattempt to transmit HARQ feedback provided the UL resources are configured for the UE ($\Delta_{HARQ}=0$ for channel access category 1), $L_{MAC,known}$ is the corresponding number of SSB occasions not available at the UE due to CCA failure, $T_{SSB}$ is the SSB periodicity.

Proposal 4: For MAC-CE based TCI state switching, the UE is required to receive PDCCH using the new TCI state (after switching or the active TCI state list update) in $$\text{slot } n+(T_{HARQ,ref}+\Delta_{HARQ})+3 \text{ ms}+TO_k*(T_{first-SSB}+T_{SSB-proc}+T_{SSB}*L_{MAC,known}),$$

and receive PDCCH using the old TCI state until $$\text{slot } n+(T_{HARQ,ref}+\Delta_{HARQ})+3 \text{ ms}+TO_k*(T_{first-SSB}+T_{SSB}*L_{MAC,known}),$$

where the parameters are as defined above.

Proposal 5: The maximum value of $\Delta_{HARQ}$ is TBD, upon exceeding which the UE may stop attempting to transmit HARQ feedback and may abandon the active TCI state switching procedure.

Proposal 6: The maximum value of $L_{MAC,known}$ is TBD and may depend on $T_{SSB}$, upon exceeding which the UE may stop the switching and abandon the active TCI state switching procedure.

RRC Based Switching

The UE is required to receive PDCCH using the new TCI state in $$\text{slot } n+T_{RRC\_processing}+TO_k*(T_{first-SSB}+T_{SSB-proc}+T_{SSB}*L_{RRC,known}),$$

when a PDSCH carrying the RRC message is received in slot n. There is no requirement on receiving PDCCH using the old TCI state during the switching period, where $L_{RRC,known}$ is the corresponding number of SSB occasions not available at the UE due to CCA failure, $T_{SSB}$ is the SSB periodicity.

Proposal 7: For RRC based TCI state switching, the UE is required to receive PDCCH using the new TCI state in $$\text{slot } n+T_{RRC\_processing}+TO_k*(T_{first-SSB}+T_{SSB-proc}+T_{SSB}*L_{RRC,known}),$$

where the parameters are as defined above.

Proposal 8: The maximum value of $L_{RRC,known}$ is TBD and may depend on $T_{SSB}$, upon exceeding which the UE may stop the switching and abandon the active TCI state switching procedure.

Active TCI State Switching in NR-U for an Unknown Cell

MAC-CE Based Switching

The UE is required to receive PDCCH using the new TCI state in $$\text{slot } n+(T_{HARQ,ref}+\Delta_{HARQ})+3 \text{ ms}+(T_{L1-RSRP}+T_{CSI-RS/SSB}*L1_{MAC,unknown})+TO_{uk}*(T_{first-SSB}+T_{SSB-proc}+T_{SSB}*L2_{MAC,unknown}),$$

and receive PDCCH using the old TCI state until $$\text{slot } n+(T_{HARQ,ref}+\Delta_{HARQ})+3 \text{ ms}+(T_{L1-RSRP}+T_{CSI-RS/SSB}*L1_{MAC,unknown})+TO_{uk}*(T_{first-SSB}+T_{SSB}*L2_{MAC,unknown}),$$

when a PDSCH carrying MAC-CE is received in slot n, where $T_{HARQ,ref}$ is the time between reception of a PDSCH transport block and transmission by the UE to the network node of an ACK or NACK on successful or unsuccessful decoding of said transport block as specified in TS 38.213 [3], $\Delta_{HARQ}$ is the delay in HARQ feedback due to UL LBT failure and UE reattempt to transmit HARQ feedback provided the UL resources are configured for the UE ($\Delta_{HARQ}=0$ for channel access category 1), $L1_{MAC,unknown}$ is the corresponding number of occasions with the signal measured for L1-RSRP not available at the UE due to CCA failure, $L2_{MAC,unknown}$ is the corresponding number of SSB occasions not available at the UE due to CCA failure, $T_{CSI-RS/SSB}$ is the periodicity of the signal measured for L1-RSRP (SSB or CSI-RS), $T_{SSB}$ is the SSB periodicity.

Proposal 9: For MAC-CE based switching, UE is required to receive PDCCH using the new TCI state in $$\text{slot } n+(T_{HARQ,ref}+\Delta_{HARQ})+3 \text{ ms}+(T_{L1-RSRP}+T_{CSI-RS/SSB}*L1_{MAC,unknown})+TO_{uk}*(T_{first-SSB}+T_{SSB-proc}+T_{SSB}*L2_{MAC,unknown}),$$

and receive PDCCH using the old TCI state until $$\text{slot } n+(T_{HARQ,ref}+\Delta_{HARQ})+3 \text{ ms}+(T_{L1-RSRP}+T_{CSI-RS/SSB}*L1_{MAC,unknown})+TO_{uk}*(T_{first-SSB}+T_{SSB}*L2_{MAC,unknown}),$$

where the parameters are as defined above.

Proposal 10: The maximum value of $\Delta_{HARQ}$ is TBD, upon exceeding which the UE may stop attempting to transmit HARQ feedback and may abandon the active TCI state switching procedure.

Proposal 11: The maximum value of $L1_{MAC,unknown}$ is TBD and may depend on $T_{CSI-RS,SSB}$, upon exceeding which the UE may restart the L1-RSRP measurement, but the UE may abandon the active TCI state switching procedure after N unsuccessful attempts to complete the L1-RSRP measurement.

Proposal 12: The maximum value of $L2_{MAC,unknown}$ is TBD and may depend on $T_{SSB}$, upon exceeding which the UE may stop the switching and abandon the active TCI state switching procedure.

RRC Based Switching

The UE is required to receive PDCCH using the new TCI state in $$slot \quad n+T_{RRC\_processing}+(T_{L1\text{-}RSRP}+T_{CSI\text{-}RS/SSB}*L1_{RRC,unknown})+TO_{uk}*(T_{first\text{-}SSB}+T_{SSB\text{-}proc}+T_{SSB}*L2_{RRC,unknown}),$$

where $L1_{RRC,unknown}$ is the corresponding number of occasions with the signal measured for L1-RSRP not available at the UE due to CCA failure, $L2_{RRC,unknown}$ is the corresponding number of SSB occasions not available at the UE due to CCA failure, $T_{CSI\text{-}RS/SSB}$ is the periodicity of the signal measured for L1-RSRP (SSB or CSI-RS), $T_{SS}B$ is the SSB periodicity.

Proposal 13: For RRC-based switching, the UE is required to receive PDCCH using the new TCI state in $$slot \quad n+T_{RRC\_processing}+(T_{L1\text{-}RSRP}+T_{CSI\text{-}RS/SSB}*L1_{RRC,unknown})+TO_{uk}*(T_{first\text{-}SSB}+T_{SSB\text{-}proc}+T_{SSB}*L2_{RRC,unknown}),$$

where the parameters are as defined above.

Proposal 14: The maximum value of $L1_{RRC,unknown}$ is TBD and may depend on $T_{CSI\text{-}RS,SSB}$, upon exceeding which the UE may restart the L1-RSRP measurement, but the UE may abandon the active TCI state switching procedure after N unsuccessful attempts to complete the L1-RSRP measurement.

Proposal 15: The maximum value of $L2_{RRC,unknown}$ is TBD and may depend on $T_{SSB}$, upon exceeding which the UE may stop the switching and abandon the active TCI state switching procedure.

Section B

In R4-1907331, WF on RRM requirements for NR-U, Ericsson, May 2019, it was agreed that PSCell addition/release delay requirements for NR-U are needed for Scenario B.

The following has been further agreed in R4-1910551, WF on RRM requirements for NR-U, Ericsson, Qualcomm Inc., Nokia, Nokia Shanghai Bell, August 2019, in RAN4 #92:

The PSCell release delay is not subject to signal availability and the existing requirements in 7.31 of 36.331 should apply Herein, we further discuss the PSCell addition delay requirements for NR-U.

PSCell Addition Delay in NR

In Rel-15, upon receiving PSCell addition in subframe n, the UE shall be capable to transmit PRACH preamble towards PSCell no later than in subframe $n+T_{config\_PSCell}$, where $$T_{config\_PSCell}=T_{RRC\_delay}+T_{processing}+T_{search}+T_\Delta+T_{PSCell\_DU}+2 \text{ ms}$$

$T_{RRC\_delay}$ is the RRC procedure delay as specified in TS 36.331.

$T_{processing}$ is the SW processing time needed by UE, including RF warm up period. $T_{processing}=20$ ms for FR1.

$T_{search}$ is the time for AGC settling and PSS/SSS detection. If the target cell is known, $T_{search}=0$ ms. If the target cell is unknown, provided that the side condition Ês/Iot≥[−2] dB is fulfilled, $T_{search}=3*T_{rs}$ ms.

$T_\Delta$ is time for fine time tracking and acquiring full timing information of the target cell. $T_\Delta=1*T_{rs}$ ms for a known and for an unknown PSCell.

$T_{PSCell\_DU}$ is the delay uncertainty in acquiring the first available PRACH occasion in the PSCell. $T_{PSCell\_DU}$ is up to the summation of SSB to PRACH occasion association period and 10 ms. SSB to PRACH occasion associated period is defined in Table 8.1-1 of TS 38.213.

Trs is the SMTC periodicity of the target cell if the UE has been provided with an SMTC configuration for the target cell in PSCell addition message, otherwise Trs is the SMTC configured in the measObjectNR having the same SSB frequency and subcarrier spacing. If the UE is not provided SMTC configuration or measurement object on this frequency, the requirement in this section is applied with Trs=[5] ms and under the condition that the SSB transmission periodicity is [5] ms.

Known PSCell Definition in NR-U

In presence of LBT, the UE needs to correctly differentiate between known and unknown states of PSCell, otherwise the PSCell may e.g. always treated as unknown which means much longer procedure delays.

The NR PSCell is known if it has been meeting the following conditions:

During the last [5] seconds before the reception of the NR PSCell configuration command:

the UE has sent a valid measurement report for the NR PSCell being configured and One of the SSBs measured from the NR PSCell being configured remains detectable according to the cell identification conditions specified in clause 9.3 of TS 38.133.

One of the SSBs measured from NR PSCell being configured also remains detectable during the NR PSCell configuration delay according to the cell identification conditions specified in clause 9.3 of TS 38.133.

Otherwise it is unknown.

Proposal 1: The known PSCell definition needs to be updated for NR-U.

To adapt the known PSCell cell definition for NR-U, a few aspects need to be updated, including the time since the last measurement report, UE ability to send reports in presence of UL LBT, detectability which cannot be always guaranteed due to LBT, etc.

Proposal 2: Measured SSB remains detectable according to the cell identification conditions in the occasions where the SSB is available at the UE.

Proposal 3: The time before the reception of the PSCell configuration command is extended to account for DL LBT, e.g., to [5] seconds+$L*T_{RS}+\Delta$, where L is the number of SMTC occasions not available at the UE due to CCA, and A is the reporting delay due to UL LBT failure and UE reattempt(s) to report at least 1 measurement for the PSCell being configured provided the UL resources are configured for the UE ($\Delta=0$ for channel access category 1).

Proposal 4: The maximum values of L and A are TBD, upon exceeding which the UE shall assume the PSCell is unknown.

Extended PSCell Addition Delay in NR-U

Proposal 5: To account for DL and UL LBT, $T_{config\ PSCell}$ is extended, to be specified in TS 36.133.

Namely, the following components of the $T_{config\ PSCell}$ specified in TS 38.133 are impacted by LBT: $T_{search}$, $T_\Delta$, and $T_{PSCell\_DU}$.

The impact of LBT may be captured as follows:

$$T_{config\_PSCell}=T_{RRC\_delay}+T_{processing}+T_{search}+T_\Delta+(TP_{SCell\_DU,ref}+\Delta_{PRACH})+2 \text{ ms},$$

where $T_{search}$=0 for the known PSCell and $T_{search}$=(3±L1)*$T_{rs}$, $T_A$=$T_{rs}$*(1+L2), L1 and L2 are the corresponding numbers of SMTC occasions not available at the UE due to CCA failure, $T_{PSCell\_DU,ref}$ is the delay uncertainty in acquiring the first PRACH occasion in the PSCell without considering CCA. $T_{PSCell\_DU}$ is up to the summation of SSB to PRACH occasion association period and 10 ms. SSB to PRACH occasion associated period is defined in Table 8.1-1 of TS 38.213 [3], $\Delta_{PRACH} \leq \Delta_{PRACH.max}$ is the additional delay from the first PRACH occasion to the PRACH occasion where the UE can transmit, the delay is due to UL LBT failure and UE reattempt to transmit PRACH ($\Delta_{PRACH}$=0 for channel access category 1) and hence depends on the number of UE attempts to get the channel for the transmission.

Proposal 6: $T_{config-PSCell}$=$T_{RRC\_delay}$+$T_{processing}$+$T_{search}$+$T_A$+($T_{PSCell\_DU,ref}$+$\Delta_{PRACH}$)+2 ms, with $T_{search}$=0 for the known PSCell and $T_{search}$=(3+L1)*Trs for unknown PSCell, $T_A$=Trs*(1+L2), and where the other parameters are defined as above.

Proposal 7: The maximum value of $\Delta_{PRACH}$ ($\Delta_{PRACH,max}$) is TBD, upon exceeding which the UE can stop attempting to transmit PRACH and can abandon the PSCell addition procedure.

Proposal 8: The maximum values of L1 and L2 are TBD and may depend on $T_{RS}$, upon exceeding which the UE can restart the search and timing acquisition procedures, but the UE can abandon the PSCell addition after N unsuccessful attempts to complete the search and the timing acquisition procedures.

Section C

The following has been agreed in R4-1910551, WF on RRM requirements for NR-U, Ericsson, Qualcomm Inc., Nokia, Nokia Shanghai Bell, August 2019, on SCell activation delay for NR-U in RAN4 #92:

The SCell activation delay in NR-U needs to be extended by accounting for the number of missed SSBs at the UE due to DL LBT failures during $T_{activation\_time}$ and $T_{CSI\_reporting}$ The maximum acceptable number of missed SSBs due to LBT is TBD The known SCell definition needs to be updated for NR-U The SCell activation delay needs to be further extended, by the time reflecting the number of UL LBT failures, if the UE needs to perform UL LBT prior to sending ACK The related agreements R4-1907331, WF on RRM requirements for NR-U, Ericsson, May 2019, from RAN4 #91 for NR-U SCells:

Activation period: may depend on SSB availability, a new requirement may be needed Deactivation period: does not depend on SSB availability, Rel-15 NR requirement can be a baseline.

Herein, we further discuss SCell activation delay for NR-U.

SCell Activation Delay in NR

In NR FR1, upon receiving SCell activation command in slot n, the UE shall be capable to transmit valid CSI report and apply actions related to the activation command for the SCell being activated no later than in slot $$n + \frac{T_{HARQ} + T_{activation} + T_{CSI\_Reporting}}{NR \text{ slot length}},$$

where:

$T_{HARQ}$ (in ms) is the timing between DL data transmission and acknowledgement as specified in TS 38.213 [3]

$T_{activation\_time}$ is the SCell activation delay in millisecond.

If the SCell is known and belongs to FR1, $T_{activation\_time}$ is:

$T_{FirstSSB}$+5 ms, if the SCell measurement cycle is equal to or smaller than 160 ms.

$T_{SMTC\_MAX}$ $T_{rs}$+5 ms, if the SCell measurement cycle is larger than 160 ms.

If the SCell is unknown and belongs to FR1, $T_{activation\_time}$ is:

2*$T_{SMTC\_MAX}$ 2*$T_{rs}$+5 ms provided the SCell can be successfully detected on the first attempt.

Where $T_{SMTC\_MAX}$:

For intra-band SCell activation, $T_{SMTC\_MAX}$ is the longer SMTC periodicity between active serving cells and SCell being activated provided the cell specific reference signals from the active serving cells and the SCells being activated or released are available in the same slot; in case of For inter-band SCell activation, $T_{SMTC\_MAX}$ is the SMTC periodicity of SCell being activated.

$T_{SMTC\_MAX}$ is bounded to a minimum value of 10 ms.

$T_{rs}$ is the SMTC periodicity of the SCell being activated if the UE has been provided with an SMTC configuration for the SCell in SCell addition message, otherwise $T_{rs}$ is the SMTC configured in the measObjectNR having the same SSB frequency and subcarrier spacing. If the UE is not provided SMTC configuration or measurement object on this frequency, the requirement which involves $T_{rs}$ is applied with $T_{rs}$=5 ms assuming the SSB transmission periodicity is 5 ms. There is no requirements if the SSB transmission periodicity is not 5 ms $T_{FirstSSB}$: Is the time to first SSB indicated by the SMTC after n+$T_{HARQ}$+3 ms $T_{CSI\_reporting}$ is the delay (in ms) including uncertainty in acquiring the first available downlink CSI reference resource, UE processing time for CSI reporting and uncertainty in acquiring the first available CSI reporting resources as specified in TS 38.331 [2].

In addition to CSI reporting defined above, UE shall also apply other actions related to the activation command specified in TS 38.331 [2] for a SCell at the first opportunities for the corresponding actions once the SCell is activated.

Starting from the slot specified in clause 4.3 of TS 38.213 [3] (timing for secondary Cell activation/deactivation) and until the UE has completed the SCell activation, the UE shall report out of range if the UE has available uplink resources to report CQI for the SCell.

SCell Activation in NR-U

Known SCell Definition

In Rel-15, an NR S Cell in FR1 is known if it has been meeting the following conditions:

During the period equal to max([5] measCycleSCell, [5] DRX cycles) for FR1 before the reception of the SCell activation command:

the UE has sent a valid measurement report for the SCell being activated and the SSB measured remains detectable according to the cell identification conditions specified in clause 9.2 and 9.3.

the SSB measured during the period equal to max([5] measCycleSCell, [5] DRX cycles) also remains detectable during the SCell activation delay according to the cell identification conditions specified in clause 9.2 and 9.3.

Otherwise the SCell in FR1 is unknown.

To adapt the known SCell definition to NR-U, a few aspects need to be updated, including the measurement period before the reception of the SCell activation command and detectability which cannot be always guaranteed due to missing signal, sending a valid measurement report in presence of UL LBT failures.

Proposal 1: The period before the reception of the SCell activation command is extended, e.g., to $(S+L_{DL})$ measCycleSCell$+\Delta_{UL}$ when DRX is not configured, and $\max((5+L_{DL})$ measCycleSCell, $(5+L_{DL})$ DRX cycles)$+\Delta_{UL}$ when DRX is configured, where $L_{DL} \le L_{DL,max}$ is the number of measurement occasions with SSBs not available at the UE due to CCA, $\Delta_{UL} \le \Delta_{UL,max}$ is the additional delay due to UE inability to send a valid measurement report on a carrier frequency with CCA ($\Delta_{UL}=0$ for UL channel access category 1).

Proposal 2: $L_{DL,max}$=TBD and $\Delta_{UL,max}$=TBD, upon exceeding any of which the SCell can be considered unknown.

Proposal 3: SSB remains detectable according to the cell identification conditions in clause 9.2 and 9.3 in the occasions where the SSB is available at the UE.

Extended SCell Activation Delay in NR-U

Next, we discuss the impact of LBT on the SCell activation delay.

Starting from $T_{HARQ}$, for channel access category 2 and 4, the UL LBT failure may occur and the HARQ feedback transmission may be additionally delayed.

Proposal 4: $T_{HARQ}=T_{HARQ,ref}+\Delta_{HARQ}$, where $T_{HARQ,ref}$ is the timing between DL data transmission and acknowledgement as specified in TS 38.213 [3], and $\Delta_{HARQ} \le \Delta_{HARQ,max}$ is the delay in HARQ feedback due to UL LBT failure and UE reattempt to transmit HARQ feedback provided the resources are configured for the UE ($\Delta_{HARQ}=0$ for channel access category 1).

Proposal 5: $\Delta_{HARQ,max}$=TBD, upon exceeding which the UE can stop attempting to transmit HARQ feedback and can abandon the SCell activation procedure.

Furthermore, also the SCell activation time $T_{activation\_time}$ is also impacted by DL LBT failures and is therefore extended as follows.

Proposal 6: $T_{activation\_time}$ is defined as follows (where $L1 \le L1_{max}$, $L2 \le L2_{max}$, and $L3 \le L3_{max}$ are the corresponding numbers of SSB occasions not available at the UE due to CCA failure):

For a known SCell:

$T_{FirstSSB}+T_{rs}*L1+5$ ms, if the SCell measurement cycle is equal to or smaller than 160 ms.

$(T_{SMTC\_MAX}+T_{rs})*(1+L2)+5$ ms, if the SCell measurement cycle is larger than 160 ms.

For an unknown SCell:

$(T_{SMTC\_MAX}+T_{rs})*(2+L3)+5$ ms, provided the SCell can be successfully detected in one attempt.

Proposal 7: $L1_{max}$, $L2_{max}$, and $L3_{max}$ are TBD, upon exceeding which the UE can stop activating the SCell and can abandon the SCell activation procedure.

Next the UE is expected to report a valid CSI report during $T_{CSI\_reporting}$ which may also be impacted by UL LBT failure.

Proposal 8: $T_{CSI\_reporting}=T_{CSI\_reporting,ref}+\Delta_{CSI}$, where $T_{CSI\_reporting,ref}$ is the delay (in ms) including uncertainty in acquiring the first available downlink CSI reference resource, UE processing time for CSI reporting and uncertainty in acquiring the first available CSI reporting resources as specified in TS 38.331 [2], and $\Delta_{CSI} \le \Delta_{CSI,max}$ is the additional delay due to UL LBT failure and UE reattempt to transmit CSI report provided the resources are configured for the UE ($\Delta_{CSI}=0$ for channel access category 1).

Proposal 9: $\Delta_{CSI,max}$=TBD, upon exceeding which the UE can stop attempting to transmit CSI report and can abandon the SCell activation procedure.

Interruption Window

After sending the HARQ feedback to the serving cell (after receiving the SCell activation command) the UE may cause interruption over a certain time period, some interruption window which is not allowed to start earlier than a specific time and finish later than another specific time. In Rel-15, this is controlled by the following requirements:

The interruption on PSCell or any activated SCell in SCG for EN-DC mode specified in clause 8.2 shall not occur before slot $n+1+[T_{HARQ}]$/slot_length and not occur after slot $n+1+[T_{HARQ}+3$ ms$+T_{SMTC\_MAX}+T_{SMTC\_duration}]$/slot_length.

The interruption on PCell or any activated SCell in MCG for NR standalone mode specified in clause 8.2 shall not occur before slot $n+1+[T_{HARQ}]$/slot_length and not occur after slot $n+1+[T_{HARQ}+3$ ms$+T_{SMTC\_MAX}+T_{SMTC\_duration}]$/slot_length.

(Note that the current version of specification does not scale with the slot length and therefore is incorrect with respect to the time units.)

In NR-U, the starting time of the interruption window needs to dynamically adapt to the UL LBT outcome. Namely, the corresponding interruptions shall not occur before slot $n+1+(T_{HARQ}+\Delta_{HARQ,L})$/slot_length and shall not occur after slot $n+1+((T_{HARQ}+\Delta_{HARQ,L})+3$ ms$+T_{SMTC\_MAX}+T_{SMTC\_duration})$/slot_length, $\Delta_{HARQ,L}$ is the additional delay after the first HARQ feedback occasion due to L missed HARQ feedback occasions until the HARQ feedback is sent in the last occasion.

Proposal 10: The timing of the interruption window for SCell activation in NR-U is defined so that the corresponding interruptions shall not occur before slot $n+1+(T_{HARQ}+\Delta_{HARQ,L})$/slot_length and shall not occur after slot $n+1+((T_{HARQ}+\Delta_{HARQ,L})+3$ ms$+T_{SMTC\_MAX}+T_{SMTC\_duration})$/slot_length, where L is the number of UE failures to access the channel to transmit HARQ feedback.

The invention claimed is:

1. A method performed by a wireless device, the method comprising:

receiving, from a network node, a command associated with a procedure to activate or deactivate a secondary cell, SCell;

while transmitting a Hybrid Automatic Repeat Request, HARQ, feedback associated with the procedure to activate or deactivate the SCell, detecting one or more clear channel assessment, CCA, failures on an uplink signal; and based on a number of times the wireless device is unable to send the HARQ feedback due to the one or more CCA failures on the uplink signal, extending a time period duration for transmitting the HARQ feedback associated with the procedure to activate or deactivate the SCell.

2. The method of claim 1, wherein extending the time period duration for transmitting the HARQ feedback comprises extending a variable time period duration based on the number of times the wireless device is unable to send the HARQ feedback due to the one or more CCA failures.

3. The method of claim 1, wherein extending the time period duration for transmitting the HARQ feedback comprises increasing a maximum number of times the wireless device is allowed to fail to send the HARQ feedback due to the one or more CCA failures.

4. The method of claim 1, wherein extending the time period duration for transmitting the HARQ feedback comprises adapting a starting time instance of an interruption period caused by the procedure.

5. The method of claim 1, wherein the HARQ feedback comprises a HARQ acknowledgement or a HARQ negative acknowledgement.

6. The method of claim 1, wherein the HARQ feedback comprises a measurement report.

7. The method of claim 1, wherein:

detecting the one or more CCA failures on the uplink signal comprises determining that the HARQ feedback was not successfully sent to the network node during time period duration prior to a triggering of the procedure to activate or deactivate the SCell; and extending the transmission period for transmitting the HARQ feedback associated with the procedure comprises selecting an amount of time for performing the procedure based on the HARQ feedback not being successfully sent to the network node during the time period duration prior to a triggering of the procedure.

8. The method of claim 7, wherein the amount of time is selected from a plurality of time period durations based on a type of the one or more CCA failures, wherein each of the plurality of time period durations is associated with a respective type of CCA failure.

9. The method of claim 7, wherein the amount of time is an actual reporting delay associated with the one or more CCA failures or a maximum acceptable reporting delay for the one or more CCA failures.

10. The method of claim 7, wherein the amount of time is selected based on an actual number of transmission attempts of the HARQ feedback.

11. The method of claim 1, wherein the procedure to activate or deactivate the SCell comprises transmitting a PRACH preamble towards the cell.

12. The method of claim 1, wherein the procedure to activate or deactivate the SCell comprises transmitting a channel state information (CSI) report.

13. The method of claim 1, further comprising detecting an event triggering the procedure to activate or deactivate the SCell.

14. The method of claim 13, wherein the event comprises receiving a command from the network node.

15. The method of claim 1, further comprising:

while performing the procedure to activate or deactivate the SCell, determining a CCA impact of performing the procedure; and comparing the CCA impact to at least one threshold, wherein the CCA failure is associated with one of a plurality of types of CCA failures, and wherein a respective one of a plurality of thresholds is associated with each type of CCA failure within the plurality of types of CCA failures.

16. The method of claim 15, further comprising:

completing the procedure if the CCA impact of performing the procedure is equal to or less than the at least one threshold; or stopping the procedure if the CCA impact of performing the procedure is greater than the at least one threshold.

17. The method of claim 15, further comprising:

restarting at least a portion of the procedure if the CCA impact of performing the procedure is equal to or greater than the at least one threshold.

18. The method of claim 17, further comprising counting a number of times at least the portion of the procedure has been restarted and abandoning the procedure if the number of times is greater than a threshold.

19. The method of claim 1, further comprising maintaining a timer and abandoning the procedure or a portion of the procedure if the timer expires.

20. A wireless device comprising processing circuitry configured to perform any of the method of claim 1.

21. A method performed by a wireless device, the method comprising:

while performing a procedure to activate or deactivate a secondary cell, SCell, detecting one or more clear channel assessment, CCA, failures; and determining an interruption window during which the wireless device is unable to transmit or receive due to the CCA failure, and wherein the interruption window comprises a time period duration during which the wireless device is unable to transmit or receive due to a number of times the wireless device is unable to send HARQ feedback due to the one or more CCA failures on the uplink signal.

22. The method of claim 21, wherein the time period duration comprises a variable time period duration during which the wireless device is unable to transmit or receive due to the number of times the wireless device is unable to send HARQ feedback due to the one or more CCA failures.

23. The method of claim 21, wherein determining the interruption window comprises determining at least one of a lower time boundary and an upper time boundary of the interruption window.

24. The method of claim 21, further comprising determining that the interruption window does not occur outside an allowed interruption window.

25. A wireless device comprising processing circuitry configured to perform the method of claim 21.

* * * * *